United States Patent
Fried

[15] 3,683,006
[45] Aug. 8, 1972

[54] CYCLODECAPENTAENE COMPOUNDS

[72] Inventor: John H. Fried, Palo Alto, Calif.

[73] Assignee: Syntex Corporation, Panama, Panama

[22] Filed: Sept. 9, 1970

[21] Appl. No.: 70,905

Related U.S. Application Data

[63] Continuation-in-part of Ser. No. 742,140, July 3, 1968, abandoned.

[52] U.S. Cl..........260/468 B, 260/345.9, 260/347.8, 260/410, 260/457, 260/468 R, 260/469, 260/473 S, 260/476 R, 260/479 R, 260/482 R, 260/484 R, 260/487, 260/488 H, 260/500.5 H

[51] Int. Cl..........................C07c 61/28, C07c 61/32

[58] Field of Search...............................260/514, 468

[56] References Cited

UNITED STATES PATENTS 3,525,770    8/1970    Chow.........................260/563

Primary Examiner—Lorraine A. Weinberger
Assistant Examiner—Robert Gerstl
Attorney—Evelyn K. Merker and Walter H. Dreger

[57] ABSTRACT

Novel 1,6-methano-, 1,6-dichloromethano-, and 1,6-difluoromethano- cyclodecapentaene alcohols, aldehydes and acids and derivatives having anti-inflammatory and fibrinolytic activity.

11 Claims, No Drawings

CYCLODECAPENTAENE COMPOUNDS

This is a continuation-in-part of patent application Ser. No. 742,140, filed July 3, 1968, now abandoned.

This invention relates to novel cyclodecapentaene compounds of the following formulas A and B:

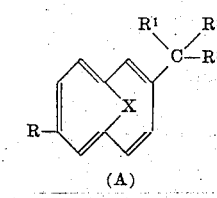
(A)

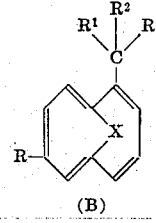
(B)

wherein,

R is hydrogen, lower alkyl, lower monocyclic alkyl, lower alkoxy or lower carboxylic acyloxy;

$R^1$ is hydrogen or lower alkyl;

$R^2$ is hydrogen, lower alkyl, methylene when taken together with $R^1$, or lower monocyclic alkyl when taken together with $R^1$ and the carbon atom to which $R^1$ and $R^2$ are attached;

$R^3$ is —CHO, —$CH_2$—$R^4$, —$COOR^5$, —$CON(R^6)_n$ or —CONHOH, in which $R^4$ is hydroxy or the hydrolyzable esters or ethers thereof, $R^5$ is hydrogen, lower alkyl or an alkali metal, and each $R^6$ is hydrogen or lower alkyl; and X is methylene, dichloromethylene or difluoromethylene.

The term "lower alkyl" in the present context, refers to a straight or branched saturated acyclic aliphatic hydrocarbon group containing from one to six carbon atoms and 1 and 2...and 6 and 1 to 2...to 6 carbon atoms; methyl, ethyl, propyl, butyl, pentyl, and hexyl, the various isomers thereof. "Lower monocyclic alkyl" contains three to six carbon atoms, cyclopropyl, cyclobutyl, cyclopentyl, and cyclohexyl. The term "lower alkoxy" refers to the group "lower alkyl O", "lower alkyl" being as defined above. The term "lower carboxylic acyloxy" refers to a carboxylic acyloxy group containing up to about eight carbon atoms of a straight, branched or cyclic chain structure derived from carboxylic anhydrides such as acetic anhydride, trifluoroacetic anhydride, propionic anhydride, n-caproic anhydride, benzoic anhydride, heptoic anhydride, acetic propionic anhydride, maleic anhydride, phenylacetic anhydride, p-methoxybenzoic anhydride, trimethylacetic anhydride, butyric anhydride, and the like, preferably lower alkanoic anhydrides of up to 12 carbon atoms. The expression "hydrolyzable esters and ethers," as used herein, refers to those physiologically acceptable hydrolyzable ester groups and labile ether groups conventionally employed in the pharmaceutical art such as acetate, propionate, butyrate, trimethylacetate, valerate, methylethylacetate, caproate, t-butylacetate, 3-methylpentanoate, enanthate, caprylate, triethylacetate, pelargonate, decanoate, undecanoate, benzoate, phenylacetate, diphenylacetate, cyclopentylpropionate, methoxyacetate, aminoacetate, diethylaminoacetate, trichloroacetate, β-chloropropionate, bicyclo [2.2.2] octane-1'-carboxylate, adamantoate, dihydrogen phosphate, dibenzyl phosphate, sodium ethyl phosphate, sodium sulfate, sulfate, tetrahydropyran-2'-yl ether, tetrahydrofuran-2'-yl ether, 4'-methoxytetrahydropyran-4'-yl ether, and the like.

The compounds of the present invention are prepared by the process outlined as follows:

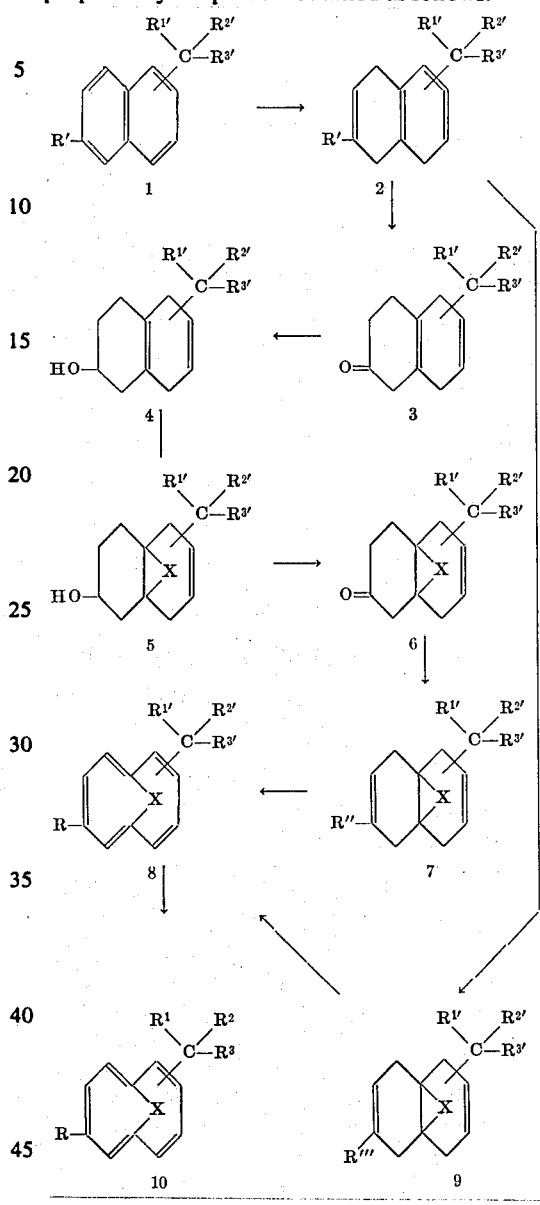

With reference to the above reaction sequence, the following definitions apply:

R' is hydrogen, lower alkyl, lower monocyclic alkyl, or lower alkoxy;

$R^{1'}$ is hydrogen or lower alkyl;

$R^{2'}$ is hydrogen, lower alkyl, or lower monocyclic alkyl when taken together with $R^1$ and the carbon atom to which $R^1$ and $R^2$ are attached;

$R^3$ is —$CH_2R^4$ or -$COOR^5$, in which $R^4$ is hydroxy or a conventional hydrolyzable ether thereof and $R^5$ is hydrogen;

R'' is lower alkoxy or lower carboxylic acyloxy;

R''' is hydrogen, lower alkyl, or lower monocyclic alkyl; and each of R, $R^1$, $R^2$, $R^3$, and X is as defined hereinbefore.

In one aspect of the process above depicted a 6-lower alkoxy naphthalene compound (1; R' = lower alkoxy) is reacted with an alkali metal and an alcohol in a lower alkyl amine or diamine or in liquid ammonia to prepare the corresponding 6-lower alkoxy-1,4,5,8-tetrahydronaphthalene (2; R'=lower alkoxy).

In this reaction, suitable and preferred alkali metals are sodium, potassium and lithium. This reaction is conveniently conducted in the presence of a monohydric lower alkanol of from one to six carbon atoms such as methanol, ethanol n-propanol, isopropanol, n-butanol, isobutanol, sec-butanol, t-butanol, n-amyl alcohol, and the like, either alone or in admixture with other organic liquid reaction media, such as dioxane, tetrahydrofuran, diethyl ether, glyme, dimethyl-sulfoxide, n-hexane, and the like. The reaction is further conducted at temperatures ranging from about −80° to 100°C. and for a period of time sufficient to produce product, ranging from about five minutes to about two weeks.

The compound (2) is then treated with acid, for example, oxalic acid, acetic acid, and the like to obtain the corresponding 6-oxo-1,4,5,6,7,8-hexahydronaphthalene(3). This compound is then reduced such as with sodium borohydride to form the corresponding 6-hydroxy compound (4). To the 6-hydroxy-1,4,5,6,7,8-hexahydronaphthalene (3) is added the group

wherein each X is hydrogen, chloro, fluoro, across the C-9,10 double bond to yield the corresponding 6-hydroxy-9,10-bridged-1,4,5,6,7,8,9,10-octahydronaphthalene (5). The resultant compound (5) is oxidized to the 6-oxo compound (6) such as with chromic acid in pyridine. The 6-oxo-9,10-bridged-1,4,5,7,8,9,10-heptahydronaphthalene (6) is converted to the corresponding enol ethers and enol acetates (7) via conventional methods known per se. In this method, each of or both of the 9,10-bridged-1,4,5,8,9.10-hexahydro-6-enol product and 9,10-bridged-1,4,7,8,9,10-hexahydro-6-enol product may be formed depending upon the conditions employed. They are separable by conventional techniques and each or the mixture is useful for preparing compounds (8). The resultant compounds (7) are then treated with a benzoquinone to yield the corresponding 6-lower alkoxy- and -lower carboxylic acyloxy-1,6-bridged-[10]-annulenes (8; R=lower alkoxy or lower carboxylic acyloxy).

In the

group addition, the

group is generally generated in situ and in the presence of inert, liquid organic reaction medium. Suitable media include those defined infra for the benzoquinone reagent aa well as the chlorinated hydrocarbon solvents such as methylene chloride, chloroform and carbon tetrachloride.

The halocarbene reactant is generated from a haloform and alkali metal tertiary alkoxide, or from an alkali or alkaline earth metal salt of a trihaloacetic acid such as sodium trichloroacetate, or from a phenyl-trihalomethyl mercury such as phenyltrifluoromethyl mercury and phenyltrichloromethyl mercury.

The halocarbene reactant is prepared by reacting together a haloform, wherein the halo is defined above, with an alkali alkoxide, preferably an alkali metal tertiary alkoxide. In one procedure, the reaction mixture containing haloform and alkali metal tertiary alkoxide is heated to the boiling point and maintained under reflux for a period of time sufficient to produce the halocarbene reactant ranging from about 30 minutes to about 5 hours. Suitable haloforms employed in the above process include chloroform, bromodichloromethane, and chlorodifluoromethane. Representative alkali metal tertiary alkoxides employed in the above process include potassium t-butoxide and sodium t-amylate.

The reaction can also be performed by reacting together the starting compound and a phenyl-trihalomethyl mercury such as phenyltrifluoromethyl mercury and phenyltrichloromethyl mercury. This reaction is conveniently conducted in liquid organic reaction medium, such as those listed above, and at temperatures of from about 25°C. to the boiling point of the reaction mixture.

In another procedure, the starting compound is reacted with an alkali or alkaline earth metal salt of a trihaloacetic acid in an organic solvent, preferably diglyme or triglyme, and at a temperature above the decomposition temperature of the salt. In this regard, the details of U.S. Pat. No. 3,338,928 are hereby incorporated by reference.

In those instances in which each X is hydrogen, the methylene group is generated from zinc:copper couple, methylene iodide reagent. The zinc:copper couple methylene iodide reagent is prepared from zinc dust, a copper salt such as cuprous chloride and methylene and methylene iodide. Typically, the reagent is prepared by contacting together a mixture of the copper salt, zinc dust, and an organic solvent, such as diethyl ether, and methylene iodide, conveniently at the reflux temperature of the mixture. See U.S. Patent 3,408,372, which is hereby incorporated by reference.

The last step; (7 → 8) involves reaction with a benzo-quinone. This reaction is conveniently performed in the presence of inert, liquid organic reaction medium. Suitable media include the normally employed organic solvents such as tetrahydrofuran, dioxane, dimethylformamide, n-hexane, toluene, benzene, mesitylene, diethyl ether, the mono- or di-lower alkyl ethers of diethylene glycol or triethylene glycol, for example, diglyme and triglyme, and the like. This reaction is further conducted at temperatures ranging from about 0°C. up to the boiling point of the reaction mixture and under reflux for a period of time sufficient to complete the reaction ranging from about a few minutes to about 48 hours.

The reaction may be performed in the presence of an anhydrous acid such as p-toluene sulfonic acid, hydrochloric, perchloric and sulfuric; however, the use of these acids is not necessary in the preferred embodiments hereof.

Suitable benzoquinones for this reaction include the ortho and parabenzoquinones which can be unsubstituted or substituted with one or more groups, notably acyl and cyano and halogen, including in the latter category, bromo, chloro, and fluoro Typical benzoquinones include 1,2-benzoquinone, 1,4-benzoquinone, 2,3-dichloro-5,6-dicyano-1,4-benzoquinone, tetrachloro-1,2-benzoquinone, 2,3-difluoro-1,4-benzoquinone, 2,3-dibenzoyl-1,4- benzoquinone, 2,3-dicyano-1,4-benzoquinone, tetrachloro-1,4-benzoquinone, 2,3-difluoro-1,2-benzoquinone, 2,3-dicyano-1,2-benzoquinone, and the like. Preferred is 2,3-dichloro-5,6-dicyano-1,4-benzoquinone (DDQ).

In carrying out this reaction, the starting compound (7) and the benzoquinone are mixed and maintained together in any convenient order or fashion. The reaction mixture is then maintained within the given temperature range for a period of time sufficient to complete the reaction. Upon the completion of the reaction, the reaction mixture is processed by conventional procedures such as dilution, chromatography, decantation, filtration, distillation, evaporation, and so forth to recover and isolate the desired product.

The given reaction consumes the respective reactants in the ratio of one mole of the starting compound (formula 7) per two moles of the benzoquinone reactant. Thus, while the use of chemical equivalent amounts of the reactants is preferred, it is not an absolute necessity, some of the desired product being prepared when employing any proportions hereof. In the usual practice, amounts of the benzoquinone are employed which range from about two moles to about 50 moles, preferably from about 2 to about 5 moles, per mole of starting compound.

In those instances wherein each X in the starting material is chloro, the 1,6-dichloromethano-2,5-dihydro-[10]-annulene intermediate compound is prepared. This is readily converted to the 1,6-dichloromethano-[10]-annulene product by first converting it to the corresponding 3,4-dibromo compound followed by the dehydrobromination thereof.

In those instances in which each X in the starting material (7) is fluoro, the employment of about one mole of the benzoquinone results predominantly in the preparation of 1,6-difluoromethano-2,5-dihydro-[10]-annulene. When employing amounts of benzoquinone in excess of about two moles per mole of starting material (7), the 1,6-difluoro-methano-[10]-annulene is produced.

With reference again to the above reaction sequence (1 to 10), the 6-unsubstituted (R = hydrogen) or 6-substituted (wherein R = lower alkyl or lower monocyclic alkyl) naphthylene (1) is converted to the corresponding 1,4,5,8-tetrahydro-naphthylene compounds (2) as set forth above. To this compound is then added the

group as set forth above to prepare the 6-unsubstituted-, 6-lower alkyl-, or 6-lower monocyclic alkyl -9,10-bridged-1,4,5,8,9,10-hexahydronaphthalene (9) which is converted with a benzoquinone as set forth above to prepare the corresponding 6-unsubstituted-, 6-lower alkyl-, and 6-lower monocyclic alkyl-1,6-bridged-[10]-annulenes (8).

The compounds represented by formula (8) are then converted to the compounds of formula (10) by methods conducted in optional order and to the extent required and desired, as described in more detail infra. Formula (10) is a generic representation of the 2 and 3 substituted compounds of the present invention represented above by formulas (A) and (B). The substituent R in formulas (8) and (10) varies as the method of preparation from the compounds of formulas (7) and (9). The α-carbon atom alkyl groups ($R^1$, $R^2$= alkyl) and the α-carbon atom spiro groups ($R^1$ and $R^2$ with attached carbon atom = monocyclic alkyl) can be present on the starting compound (1) ($R^{1'}$ and $R^{2'}$ definitions) or they can be introduced into compounds (8). In either event, the alkyl groups are introduced by alkylation of a lower alkyl ester of an acid of formulas (1) or (8) followed by hydrolysis of the ester to the free acid. In the formation of the monoalkyl compounds, i.e., one of $R^{1'}$ ($R^1$) and $R^{2'}$ ($R^2$) is hydrogen; one equivalent amount of alkylating agent is employed. Dialkyl compounds are prepared with at least two equivalents of alkylating agent where the alkyl groups are the same or consecutively with one equivalent each where the alkyl groups are different. The alkylation can be carried out by treating an alkyl ester of the acid with alkylating agent comprising an alkali metal hydride such as sodium hydride and a lower alkyl iodide in an organic solvent such as the ethers, e.g.1,2-dimethoxyethane, and thereafter removing the ester group by treatment with base, e.g., an alkali metal hydroxide or carbonate, in a lower alcohol such as methanol to afford the corresponding free acid.

The compounds of the present invention having a spiro lower monocyclic alkyl group in combination with the α-carbon atom are prepared by treating a lower alkyl ester of an acid of formula (8) or (1) wherein $R^{1'}$=$R^{2'}$ =hydrogen with an α,ω-dibromoalkane, such as 1,3-dibromopropane, 1,4-dibromo-butane, and 1,5-dibromopentane, and sodium hydride in an organic solvent such as glyme. The α-spiro cyclopropyl group is introduced by treating the α-exo methylene with methylene iodide and zinc:copper couple in accordance with Simmons-Smith conditions which are known per se.

The compounds of the present invention having an α-carbon exo methylene group($R^1$ and $R^2$ together are methylene) are prepared by treating a lower alkyl ester of an acid of formula (8) with formaldehyde or paraformaldehyde and an alkali metal alkoxide in dimethylsulfoxide. Thereafter, the α-methylene ester can be hydrolyzed to the corresponding acid.

The elaborative groups represented by $R^3$ in formula (10) are introduced using the compounds of formula (8). Alkali metal salts of the acids (8) can be prepared by treatment with a molar equivalent of an alkali metal bicarbonate, or the like, such a sodium bicarbonate, or potassium bicarbonate or by titrating a solution of the acid (8) with an alcohol solution of the appropriate alkali metal alkoxide such as sodium methoxide, potassium methoxide, and the like.

Lower alkyl esters of the acids (8) can be obtained directly by treating the acid with ethereal diazoalkane such as diazomethane or diazoethane or by treating the alkali metal salts of the acids (8) with a lower alkyl iodide or bromide such as methyl iodide, ethyl iodide, and the like, in an organic solvent such as dimethylacetamide or dimethylformamide.

The acids or esters can be reduced using, e.g. lithium aluminum hydride in tetrahydrofuran, to afford the corresponding alcohol (10; $R^3$=$CH_2OH$) which can be oxidized such as with chromic acid in pyridine or Moffatt conditions or with silver oxide to afford the aldehyde (10; $R^3$=CHO).

Compounds of the present invention of formulas (10) wherein $R^3$ is —$CH_2$—$R^4$ in which $R^4$ is hydroxy can be esterified and etherified to obtain the corresponding hydrolyzable esters and ethers. Esterification can be carried out, for example, by treating the free hydroxy compound with a carboxylic acid anhydride or carboxylic acid halide in pyridine or the like to obtain esters of organic acids. Esters of inorganic acids such as the sulfates can be prepared by treating the free hydroxy compound with a sulfur trioxide trimethylamine complex in pyridine or by procedures such as described by Kornel et al., Steroids 4, (1964); Kirdani, Steroids 6, (1965) and Bernstein, Steroids 7, 577 (1966). Phosphate esters can be prepared from the free hydroxy compounds by treatment with, e.g. β-cyanoethylphosphate in the presence of N,N'-dicyclohexylcarbodiimide in pyridine or by the method of Wendler, Chem. & Ind., 1174 (1967) or U.S. Pats. Nos. 2,936,313, 3,248,408, or 3,254,100. Alkali metal salts of the esters can be made to treatment with base, e.g. sodium ethylate, sodium or potassium bicarbonate, and the like. By controlling the amount of base, both the mono and di salts can be obtained.

By treatment of a free alcohol of formula (10) with dihydropyran or dihydrofuran in the presence of an acid catalyst, tetrahydropyranyl and tetrahydrofuranyl ethers are obtained. Tetrahydropyranyl ethers and tetrahydrofuranyl ethers can also be prepared by reacting the free alcohol with about a molar equivalent of 2-benzoyloxytetrahydropyran and 2-benzoyloxytetrahydrofuran, respectively, in an inert organic solvent under substantially neutral conditions. The 4-methoxytetrahydropyran-4'-yl ethers are obtained by reacting the free alcohol with an excess of 4-methoxy-5,6-dihydro-2H-pyran in the presence of a small amount of an acidic catalyst such as p-toluenesulfonic acid at about room temperature.

Acid amides of formulas (10) ($R^3$ is —$CON(R^6)_n$) are prepared, for example, by treating an acid of formulas A and B with thionyl chloride followed by treatment with anhydrous ammonia or lower alkyl or diloweralkyl amine. By treating an acid of formulas A and B with hydroxylamine hydrochloride in the presence of sodium methoxide, the novel hydroxamic acids of Formula (10) ($R^3$ is —CONHOH) are obtained.

Alternatively, the novel compounds of the present invention of formula (A) above wherein R is R''' can be prepared using the following outlined procedure wherein Ac is an acyl group, e.g. a lower carboxylic acyl such as acetyl, $R^7$ is an acid labile protecting group such as tetrahydropyran-2-yloxy, tetrahydrofuran-2-yloxy, t-butyloxy and the like, X' is dichloromethylene or difluoromethylene and X is as defined above.

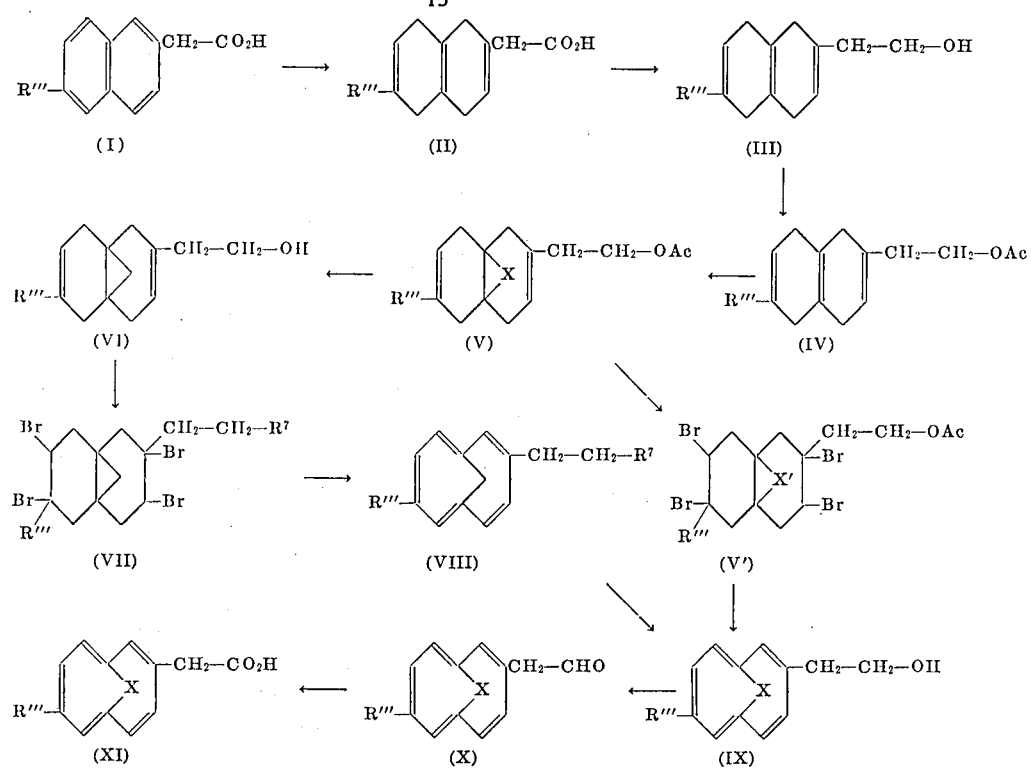

In carrying out the procedures outlined above, 2-naphthylacetic acid (I) is reduced to 1,4,5,8-tetrahydro-2-naphthylacetic acid (II) by treatment with an alkali metal such as sodium, potassium or lithium in liquid ammonia in the presence of a lower alcohol such as ethanol, t-butanol, and the like. The acid (II) is treated with a reducing agent such as lithium aluminum hydride to afford 2-(1',4',5',8'2'-naphthyl)ethanol (III). The conversion of (II) to (III) can also be carried out by first preparing the corresponding alkyl ester of (II), e.g. by treating (II) with diazamethane in ether to obtain the methyl ester of (II), and then reacting the alkyl ester of (II) with lithium aluminum hydride to obtain the alcohol (III). The alcohol (III) is next esterified in a conventional manner, e.g., by treatment with a carboxylic anhydride such as acetic anhydride in pyridine, to obtain the carboxylic ester (IV) which is reacted with a dichlorocarbene or difluorocarbene generated from sodium trichloroacetate and sodium chlorodifluoroacetate, respectively, to furnish the acetate of 2-(9',10'-dichloromethylene-1',4',5',8',9',10'-hexahydro-2'-naphthyl)ethanol (V;X' is $CCl_2$ and Ac is acetyl) and the acetate of 2-(9',10'-difluoromethylene-1',4',5',8',9',10'-hexahydro-2'-naphthyl) ethanol (V; X' is CF₂ and Ac is acetyl), respectively. This reaction is carried out in an organic solvent such as diglyme or monoglyme at an elevated temperature such as reflux.

A compound of formula (V) wherein X' is dichloromethylene is treated with an alkali metal in liquid ammonia to afford 2-(9',10'-methylene-1',4',5',8',9',10'-hexahydro-2'-naphthyl) ethanol (VI) which is etherified using, e.g. dihydropyran or dihydrofuran in a hydrocarbon solvent in the presence alcohol (IX) as described above.

The alkali metal salts and lower alkyl esters of the acids (XI) are prepared as discussed above. Similarly, the α-carbon alkyl, spiro alkyl, and exo methylene groups are introduced on the acids (XI) as described above.

As an alternative, the compounds of the present invention of formula (A) above wherein R is lower alkoxy or lower carboxylic acyloxy are prepared according to the following outlined procedure.

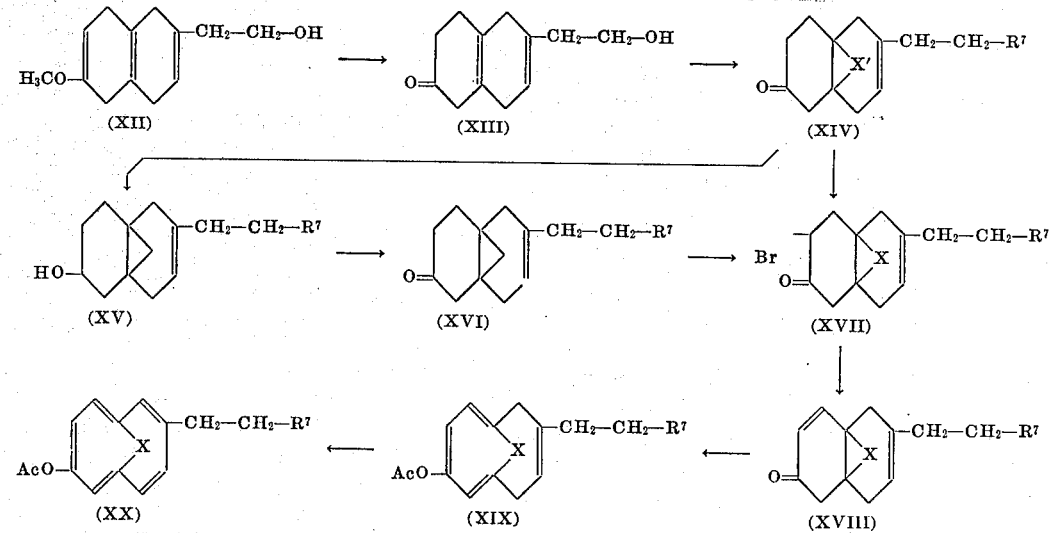

of an acid catalyst such as p-toluenesulfonic acid and then brominating using bromine in an inert organic solvent such as chloroform, carbon tetrachloride, or the like, to afford the tetrahydropyran-2-yl ether or tetrahydrofuran-2-yl ether of 2-(2',3',6',7'-tetrabromo-9',10'-methylenedecahydro-2'-naphthyl)ethanol (VII). The tetrabromo compound (VI) upon treatment with base such as an alkali metal hydroxide or alkali metal alkoxide e.g. sodium hydroxide, sodium methoxide, potassium t-butoxide and sodium t-butoxide, in an organic solvent such as ether, ethanol, diglyme, dioxane, hexamethylphosphoramide, dimethyl sulfoxide, tetrahydrofuran, and the like, is converted into the tetrahydropyran-2-yl ether or tetrahydrofuran-2-yl ether of 2'(1',6'-methanocyclodecapentaen-3'-yl)-ethanol (VIII) which is hydrolyzed by treatment with acid to furnish the corresponding free alcohol (IX; X is CH₂). The alcohol (IX) is oxidized using chromium trioxide in pyridine, Jones reagent or the procedure of U.S. Pat. No. 3,248,380 to afford the corresponding aldehyde (X) which upon further oxidation is converted into the acid (XI).

A tetrabromo compound of formula (V') is obtained by treating a compound of formula (V) with bromine in an inert organic solvent as described above. The 9',10'-dichloromethylene-2',3',6',7'-tetrabromo or 9',10'-difluoromethylene-2',3',6',7'-tetrabromo compound (V') is then treated with base as previously described to afford the alcohol (IX) wherein X is dichloromethano or difluoromethano, respectively. The corresponding aldehydes and acids of formulas (X) and (XI) are obtained by oxidation of the (IX) wherein X is dichloromethano or difluoromethano, respectively. The corresponding aldehydes and acids of formulas (X) and (XI) are obtained by oxidation of the In the above formulas Ac, R⁷, X', and X are as defined above. In the practice of the above process, 2-(6'-methoxy-1',4',5',8'-tetrahydro-2'-naphthyl)ethanol (XII) (prepared by reducing 6-methoxy-2-naphthylacetic acid or 2-(6'-methoxy-2'-naphthyl)ethanol using the method described above) is treated with acid, e.g. oxalic acid, acetic acid, or the like, to obtain 2-(6'-oxo-1',4',5',6',7',8'-hexahydro-2'-naphthyl)-ethanol (XIII) which after reduction of 6-oxo to 6-hydroxy as described above, is treated with sodium trichloroacetate or sodium chlorodifluoroacetate followed by oxidation to afford 2-(6'-oxo-9',10'-dichloromethylene-1',4',5',6',7',8',9',10'-octahydro-2'-naphthyl)ethanol and 2-(6'-oxo-9',10'-difluoromethylene-1',4',5',6',7',8',9',10'-octahydro-2'-naphthyl) ethanol, respectively, followed by etherification with dihydropyran or dihydrofuran to furnish the corresponding tetrahydropyran-2''-yl ester and tetrahydrofuran-2''-yl ester, respectively, of formula (XIV). A 9',10'-dichloromethylene of formula (XIV) is then converted into the 6'-hydroxy-9',10'-methylene derivative (XV) using an alkali metal in liquid ammonia which is oxidized using, e.g. chromium trioxide in pyridine to afford the ether of 2'(6'-oxo-9',10'-methylene-1',4',5',6',7',8',9',10'-octahydro-2'-naphthyl) ethanol (XVI). Compounds of formulas (XVI) or (XIV) are next converted into the corresponding 7,8-dehydro compounds (XVIII). This conversion can be carried out directly using 2,3-dichloro-5,6-dicyano-1,4-benzoquinone in dioxane under reflux, selenium dioxide, and the like, or by first forming the 7'-bromo intermediate (XVII) by treatment with cupric bromide in a lower alcohol such as methanol and then dehydrobrominating by treatment with an alkali halide and an alkali metal carbonate or bicarbonate or alkaline earth salt such as lithium bromide and sodium bicarbonate, lithium chloride, and sodium carbonate lithium bromide, and calcium carbonate, and the like. The tetrahydropyran-2''-yl ether or tetrahydrofuran-2''-yl or t-butyl ether of a 2-(6'-oxo-9',10'-methylene-, -dichloromethylene-, or -difluoromethylene-1',4'-5',6',9',10'-hexahydro-2'-naphthyl)-ethanol(XVIII) is treated with a carboxylic anhydride such as acetic anhydride, propionic anhydride, butyric anhydride, and the like, and an alkali metal acetate such as sodium acetate to obtain the ether of 2'(8'-acyloxy-1',6'-methano-, -dichloromethano-, or -difluoro- methano-cyclodecatetraen-3'-yl)ethanol (XIX), e.g. the tetrahydropyran-2''-yl or t-butyl ether of 2-(8'-acetoxy-1',6'-methano-cyclodecatetraen-3'-yl)ethanol (X-IX). Ac is acetyl, X is $CH_2$, $R^7$ is tetrahydropyran-2''-yloxy or t-butyloxy) is prepared from the tetrahydropyran-2''-yl or t-butyl ether of 2-(6'-oxo-9',10'A-methylene-1',4',5',6',9',10'-hexahydro-2'-naphthyl)ethanol (XVII); X is $CH_2$, $R^7$ is tetrahydropyran-2''-yloxy or t-butyloxy). A cyclodecatetraene of formula (XIX) is converted into the corresponding cyclodecapentaene (XX) using N-bromosuccinimide in carbon tetrachloride, palladium catalyst, 2,3-dichloro-5,6-dicyano-1,4-benzoquinone, and the like. An ether of formula (XX), e.g. the tetrahydropyran-2''-yl or t-butyl ether of 2-(8'-acetoxy-1',6'-methanocyclodecapentaen-3'-yl)ethanol (XX); Ac is acetyl, X is $CH_2$, $R^7$ is tetrahydropyran-2''-yloxy or t-butyloxy), is then hydrolyzed by treatment with acid to furnish the corresponding free alcohol which can be oxidized using one of the methods described hereinabove to furnish the aldehyde and acids.

The compounds of formula (A) wherein R is lower alkoxy are obtained from compounds of formula (XX) by treatment with base, e.g. an alkali metal bicarbonate such as potassium bicarbonate in aqueous methanol, followed by treatment with a lower alkyl orthoester such as a lower alkyl orthoformate, e.g. methyl orthoformate, ethyl orthoformate, n-propyl orthoformate, and the like, in the presence of an acid catalyst such as p-toluenesulfonic acid. By this method, the compounds of formula (XX) can be converted into the compounds of formula (XXI) which can be oxidized using one of the above methods to obtain the corresponding aldehydes and acids. In the following formula, X is as defined hereinabove and alkyl is lower alkyl.

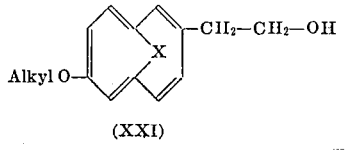

(XXI)

The above compounds (XXI) also can be converted into the corresponding mono or dialkyl substituted derivatives using the alkylation procedures described hereinabove.

The immediately proceeding processes described herein designated as alternative, for the preparation of compounds of formula A are also applicable to the preparation of the compounds of formula B using as the starting material (I) and (XII) the corresponding C-1 substituted naphthalene compounds, e.g. 1-naphthylacetic acid and 6-methoxy-1-naphthylacetic acid in place of 2-naphthylacetic acid and 6-methoxy-2-naphthylacetic acid, respectively.

The starting compounds of formulas (1) and (I) can be prepared from 2-tetralone by treating the latter with an equivalent of an alkyl or cycloalkyl magnesium bromide in an ether to obtain the corresponding 2-alkyl- and 2-cycloalkyl-3,4-dihydronaphthalene which is dehydrogenated by heating with palladium charcoal catalyst to afford the corresponding 2-alkyl- or 2-cycloalkyl-naphthalene. The resultant 2-substituted naphthalenes (including 2-loweralkoxy naphthalenes) are then reacted with acetyl chloride in nitrobenzene in the presence of at least three molar equivalents of aluminum chloride to afford the corresponding 6-substituted-2-acetylnaphthalene. The resulting compound is heated with morpholine, in the presence of sulfur at about 150°C., the resultant compound is refluxed with concentrated hydrochloric acid to furnish the corresponding 2-(6'-substituted-2'-naphthyl)-acetic acid compound.

The addition of an alkyl substituent at the C-α position is carried out by esterifying the 2-(6'-substituted-2'-naphthyl)-acetic acid derivative by conventional methods; such as by treatment with a diazoalkane, such as diazomethane, in ether to afford the corresponding alkyl ester. The ester product is then treated with sodium hydride in an ether solvent, such as 1,2-dimethoxyethane; and then treated with an alkyl halide, such as methyl iodide, to afford the corresponding 2-(6'-substituted-2'-naphthyl)propionic acid alkyl ester.

In like manner, as described above, the compounds containing an alpha carbon exo methylene group or a lower monocyclic alkyl group in combination with the alpha carbon in the R = lower alkoxy or lower carboxylic acyloxy series are prepared in accordance with the procedures described above for the R = hydrogen compounds.

The starting compounds of formulas (1) and (I) in the C-1 series are formed by first preparing the 2-substituted naphthalenes as set forth above. The substituted naphthalenes are reduced with two molar equivalents of hydrogen in the presence of a platinum, palladium, nickel catalyst,or the like, to afford the corresponding substituted tetralin (hydrogenation of the unsubstituted ring is favored; when both rings are substituted, two products are obtained with different ring saturation). The substituted tetralin is then oxidized, such as with chromium trioxide in glacial acetic acid or 8N sulfuric acid, to obtain the 6-substituted 1-tetralone.

The reaction of the 1-tetralones with one or more equivalents of a 1-carboalkoxyalkylidene triphenyl phosphorane, such as 1-carbomethoxyethylidene triphenyl phosphorane, to furnish the corresponding 1-carboalkoxyalkylidene)-tetralin. The latter upon heating with palladium charcoal catalyst affords the corresponding 1-naphthylacetic acid ester derivative.

For this purpose, the 1-carboalkoxyalkylidene triphenyl phosphorane reactant is conveniently provided upon reaction of triphenylphosphine with a 2-halocarboxylic acid ester in an organic reaction medium followed by reaction with a base.

Thus, for example, by reacting 6-methoxy-1-tetralone with a triphenylphosphorane derived from ethyl 2-halopropionate, 1,1-(1-carboethoxyeth-1',1'-ylidene)-6-methoxytetralin is prepared. Dehydrogenation thereof provides ethyl 6-methoxy-1-naphthyl-α-methylacetate which upon hydrolysis affords 6-methoxy-1-naphthyl-α-methylacetic acid.

The compounds of the present invention exhibit geometrical isomerism due to chirality of the bridehead in annulene ring system. In addition, those compounds having an asymmetric carbon atom, i.e., those wherein $R^1$ and $R^2$ are different and not both hydrogen are optically active. Each of the isomers resulting either from asymmetric carbon atoms and/or chirality, mixtures thereof, are indicated within the scope hereof. These isomers can be separated by conventional means such as by forming salts of the acids with active amines such as brucine, cinchonine, methylamine, morphine, quinidine, quinine, strychnine, or the like, and thereafter separating the diasteriomeric salts by fractional crystallization followed by regeneration of the free acid.

The compounds of the present invention of formulas (A) and (B) wherein one of $R^1$ is hydrogen and the other is alkyl of one to three carbon atoms and those wherein $R^1$ and $R^2$ together are methylene are therapeutically useful anti-inflammatory agents, analgesic agents, and anti-pyretic agents. Thus, they are useful for the treatment of inflammatory conditions of the skin, bones and muscles and pain associated therewith such as contact dermatitis, bursitis, arthritis, pruritus, and the like. They can be administered and used in the same way as phenylbutazone. For example, they can be administered orally to animals such as cats, dogs, horses, and the like for the treatment of painful arthritic and skeletal muscular disorders.

The compounds of formulas (A) and (B) wherein one of $R^1$ and $R^2$ is hydrogen and the other is alkyl of four to six carbon atoms and those wherein $R^1$ and $R^2$ are each alkyl and those wherein $R^1$ and $R^2$ and the carbon atom to which $R^1$ and $R^2$ is attached are lower monocyclic alkyl are (1) hypocholesteroemic agents and (2) fibrinolytic agents. They are thus useful for (1) lowering serum cholesterol levels and (2) the treatment of thromboembolic conditions by lysing preformed fibrin. They can be administered and used in the same way as agents possessing like activity such as (1) various sterols and (2) actase or thrombolysin.

The following examples are provided to illustrate the practice of the present invention. In the present specification and claims, the term "bridged" refers to a methano or dihalomethano group of the formula

each X being as defined above. In the present specification and claims, the root term "[10]-annulene" and the root term "cyclodecapentaene" may be used interchangeably to refer to the following basic nucleus:

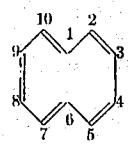

EXAMPLE 1

To a mixture of 1.6 g. of β-methoxynaphthalene, 1.6 g. of acetyl chloride, and 20 ml. of nitrobenzene, 4.0 g. of aluminum chloride are slowly added. The resulting mixture is stirred for 48 hours at 25°C.; then it is washed with water until free of chloride. The mixture is dried over sodium sulfate and evaporated under reduced pressure. The residue, 2-acetyl-6-methoxynaphthalene, is refluxed in 2 ml of morpholine containing one-half gram of sulfur for 2 hours; the reaction mixture is then filtered and evaporated. The resulting thio amide derivative is extracted with diethyl ether; the extracts are combined and evaporated. The residue is refluxed in 10 ml. of concentrated hydrochloric acid for 2 hours, cooled to 25°C. and made alkaline with aqueous sodium hydroxide. The mixture is then extracted with ether and the extracts discarded. The aqueous layer is acidified and the precipitated 6-methoxy-2-naphthylacetic acid filtered.

Similarly, 6-methyl-2-naphthylacetic acid, 6-ethyl-2-naphthylacetic acid, 6-ethoxy-2-naphthylacetic acid, 6-cyclopropyl-2-naphthylacetic acid, 6-propyl-2-naphthylacetic acid, 6-n-butyl-2-naphthylacetic acid, 6-cyclopentyl-2-naphthylacetic acid, 6-isopropyl-2-naphthylacetic acid, 6-cyclobutyl-2-naphthylacetic acid, 6-cyclohexyl-2-naphthylacetic acid, 6-propyloxy-2-naphthylacetic acid, 6-hexyl-2-naphthylacetic acid, 6-pentyl-2-naphthylacetic acid, 6-isopropyloxy-2-naphthylacetic acid, and 2-naphthylacetic acid are prepared from their respective corresponding naphthalene starting materials.

EXAMPLE 2

To a mixture of 22 g. of methyl 2-(6'-methoxy-2'-naphthyl)-acetate (prepared by treating 20.5 g. of 2-(6'-methoxy-2'-naphthyl)-acetic acid with 4.5 g. of diazomethane in ether), and 2.5 g. of sodium hydride in 150 ml. of 1,2-dimethoxyethane, 25 g. of methyl iodide are added. The reaction mixture is allowed to stand for several hours; then it is diluted with ethanol followed by water and extracted with methylene chloride. The extracts are combined, washed with water to neutrality, dried over sodium sulfate, and filtered and evaporated to yield methyl 2-(6'-methoxy-2'-naphthyl)-propionate.

This compound is base hydrolyzed to the corresponding acid. Similarly, the other 6-substituted products of Example 1 are converted to the corresponding propionic acid and esters.

EXAMPLE 3

To a solution of one chemical equivalent of triphenylphosphine in 30 ml. of benzene is added one chemical equivalent of ethyl 2-bromo-n-propionate and the mixture is refluxed for 1 hour. The reaction mixture is thereafter filtered and the insoluble material recovered and added to 50 ml. of tetrahydrofuran. One equivalent of sodium methoxide is added and the mixture is stirred until a solution forms.

To the thus prepared Wittig reagent is added one chemical equivalent of 6-methoxy-1-tetralone and the resultant mixture is heated at temperatures in the range of 150° to 200°C. until complete reaction is indicated by means of a chromatoplate. The cool reaction mixture is triturated with hexane and the crystalline triphenylphosphine oxide removed by filtration. The filtrate which contains 6-methoxy-1,1-(1'-carbethoxyeth-1',1'-ylidene)tetralone is concentrated in vacuum and the residue heated with 5 percent palladium-on-charcoal catalyst (100 mg. per gram of ester) at 180°C. for 5 hours giving ethyl 6-methoxy-1-naphthyl-α-methylacetate.

A suspension of 1 g. of ethyl 6-methoxy-1-naphthyl-α-methylacetate in 60 ml. of methanol is treated with a solution of 1 g. of potassium carbonate in 6 ml. of water. The mixture is heated at reflux for 1 hour, cooled in ice and diluted with water. The solid which forms is collected by filtration, washed with water, and dried to yield 6-methoxy-1-naphthyl-α-methylacetic acid which is recrystallized from acetone:hexane.

Similarly, the 6-substituted 1-naphthyl acid compounds otherwise corresponding to those of Example 1 are prepared by practicing the above procedures.

EXAMPLE 4

Liquid ammonia which has been dried over sodium metal and distilled (600 ml.), 300 ml. of dry tetrahydrofuran, and 150 ml. of dry methanol are mixed together with stirring. After the mixing period, 10 grams of 2-naphthylacetic acid are added to the mixture while continuing stirring. To the resultant mixture are added 5 grams of lithium wire in 0.5 gram portions over a period of 2 hours while maintaining the reaction mixture at reflux temperature. After the end of the reaction period, the ammonia is allowed to evaporate and water (100 ml.) and then 10 percent hydrochloric acid (200 ml.) are added. The reaction mixture is then extracted with ethyl acetate and the extracts dried over sodium sulfate and evaporated. The residue after evaporation is recrystallized from methanol to provide (1',4',5',8'-tetrahydronaphth-2'-yl)-acetic acid.

In accordance with the foregoing procedure, the corresponding (1',4',5',8'-tetrahydronaphth-1'-yl)-acetic acid is prepared as well as the corresponding 6-substituted derivatives thereof from the starting compounds of Examples 1,2, and 3.

EXAMPLE 5

A solution of 10 g. of 6-methoxynaphth-2-ylacetic acid in 500 ml. of methanol is treated with 10 ml. of methanol which is saturated with hydrochloric acid gas. After maintaining this treatment for 6 hours at 20°C., the solution is evaporated providing methyl 6-methoxynaphth-2-yl acetate.

A solution of 1 g. of methyl 6-methoxynaphth-2-yl acetate in 50 ml. of tetrahydrofuran is added, over a 30 minute period, to a stirred suspension of 1 g. of lithium aluminum hydride in 50 ml. of anhydrous tetrahydrofuran. The mixture is heated at reflux for 2 hours. To the mixture are cautiously added 5 ml. of ethyl acetate and 2 ml. of water. Sodium sulfate is next added, the mixture is filtered and the solid thus collected is washed with hot ethyl acetate. The combined organic solutions are then evaporated to yield 2-(6'-methoxynaphth-2'-yl)-ethanol which may be further purified through recrystallization from acetone:hexane.

The thus prepared compound is treated according to the procedure of Example 4 to provide 2-(6'-methoxy-1',4',5',8'-tetrahydro-2'-yl)-ethanol.

EXAMPLE 6

To a mixture of 2 g. of 2-(6'-methoxy-1',4',5',8'-tetra-hydronaphth-2'-yl)-ethanol and 35 ml. of methanol is added a solution of oxalic acid (0.1 g.) in water (5 ml.). This mixture is left at room temperature for about 2 hours and is then diluted with water and extracted with methylene chloride. The methylene chloride extracts are combined and then washed, dried and evaporated to give 2-(6'-oxo-1',4',5',6',7',8'-hexahydronaphth-2'-yl)-ethanol.

EXAMPLE 7

A solution of 1 g. of 2-(6'-oxo-1',4',5',6',7',8'-hexahydronaphth-2'-yl)ethanol in 50 ml. of tetrahydrofuran is added over a 30 minute period to a stirred suspension of 1 g. of lithium aluminum hydride in 50 ml. of anhydrous tetrahydrofuran and this mixture is heated at reflux for 2 hours. To the mixture are cautiously added 5 ml. of ethyl acetate and 2 ml. of water. Sodium sulfate is next added, the mixture is filtered and the solid thus collected is washed with hot ethyl acetate. The combined organic solutions are then evaporated to yield 2-(6'-hydroxy-1',4',5',6',7',8'-hexahydronaphth-2'-yl)ethanol which may be further purified through recrystallization from acetone:hexane.

EXAMPLE 8

Zinc dust (2.65 grams) and 0.75 grams of cuprous chloride are dispersed in 12.5 ml. of diethyl ether and the resultant solution is heated to the boiling point and maintained under reflux conditions and a nitrogen atmosphere for 30 minutes. After this period, the mixture is cooled to 0°C. and 1.5 ml. (5 grams) of methylene iodide are added thereto. Following the addition, the mixture is cautiously warmed to the boiling point and maintained under reflux conditions for 30 minutes. After this period, 1 gram of 2-(6'-hydroxy-1',4',5',6',7'-hexahydronaphth-2'-yl)-ethanol dispersed in 2 ml. of diethylether is added to the mixture which is cooled in ice water. The resultant mixture is maintained at 0°C. for 135 minutes after which time it is warmed to room temperature and maintained thereat for 1 hour and then warmed to reflux temperature. After refluxing for 90 minutes, the reaction mixture is cooled. A saturated aqueous ammonium chloride solution (5 ml.) is then added. The ether solution is washed with saturated aqueous sodium sulfite, and with water. The ether solution is then dried and evaporated. The crude product is chromatographed on 10 gm. silica gel eluting with ether-hexane(1:1) to provide the 2-(6'-hydroxy-9',10'-methano-1',4',5',6',7',8',9',10'$B$ -octahydronaphth-2'-yl)-ethanol product.

EXAMPLE 9

Part A 2-(6'-hydroxy-1',4',5',6',7',8'-hexahydronaphth-2'-yl)-propionic acid methyl ester (prepared as set forth in Examples 5 to 7) (40 grams) and 42.5 grams of potassium t-butoxide are added to 2 liters of ether at −55°C. with stirring. To the resultant mixture is added 36 grams of chloroform in 200 ml. of ether. The resultant reaction mixture is allowed to attain room temperature and then filtered and evaporated. The residue is recrystallized from ether: hexane to provide the 2-(6'-hydroxy-9',10'-dichloromethano-1',4',5',6',7',8',9'-10'-octahydronaphth-2'-yl)propionic acid methyl ester product.

Part B

To a stirred and refluxing solution of 1 g. of 2-(6'-hydroxy-(1',4',5',6',7',8'-hexahydronaphth-2'-yl)-propionic acid methyl ester in 10 ml. of dimethyl triethylene glycol ether is added in a dropwise fashion and under nitrogen, 10 ml. of a 50 percent w/v solution of sodium trichloroacetate. The solution is cooled and filtered and the filtrate is evaporated to dryness under reduced pressure. The residue thus obtained is chromatographed on alumina, eluting with hexane-methylene chloride, to yield the 2-(6'-hydroxy-9',10'-dichloromethano-1',4',5',6',7',8',9',10'$B$-octahydronaphth-2'-yl)propionic acid methyl ester product.

Part C

One gram of 2-(6'-hydroxy-1',4',5',6',7',8'-hexahydro-naphth2'-yl)propionic acid methyl ester and 2.7 grams of phenyltrichloromethyl mercury are dissolved in 50 ml. of dry benzene and the resulting mixture is refluxed for 3 hours under an atmosphere of nitrogen. There is then added one additional gram of the mercury reagent and refluxing is continued for an additional 5 hours after this period. After the 5 hour reflux period, 1.7 additional grams of mercury reagent are added and the resultant mixture is then filtered and the filtrate is evaporated to dryness providing an oil which is chromatographed on silica gel. The fractions are eluted with hexane:ethyl acetate to provide the 2-(6'-hydroxy-9',10'-dichloromethano-1',4',5',6',7',8',9',10'-octahydronaphth-2'-yl)propionic acid methyl ester product.

EXAMPLE 10

(6'-Hydroxy-1',4',5',6',7',8'-hexahydronaphth-2'-yl)acetic acid (4 grams) and 2.5 grams of potassium t-butoxide are dispersed in 200 mls. of diethylether at −55°C. Five grams of chlorodifluoromethane in 50 ml. of ether are then added and the mixture is allowed to warm to room temperature. The solution is then filtered and evaporated and the residue recrystallized from ethyl acetate at −20°C. to provide the (6'-hydroxy-9',10'-difluoromethano-1',4',5',6',7',8',9',10'-octahydronaphth-2'-yl)acetic acid product.

The procedures of Parts B and C of Example 9 are repeated using the starting material of the first paragraph of this example and sodium chlorodifluoroacetate and phenyltrifluoromethyl mercury, respectively, to provide the (6'-hydroxy-9',10'-difluoromethano-1',4',5',6',7',8',9',10'-octahydronaphth-2'-yl)acetic acid product.

EXAMPLE 11

A solution of 6 g. of 2-(6'-hydroxy-9',10'-methano-1',4',6',7',8',9',10'-octahydronaphth-2'-yl)-acetic acid in 120 ml. of pyridine is added to a mixture of 6 g. of chromic trioxide in 20 ml. of pyridine. The reaction mixture is allowed to stand at room temperature for 15 hours, diluted with ethyl acetate and filtered through Celite diatomaceous earth. The filtrate is washed well with water, dried and evaporated to dryness to yield 2-(6'-oxo19',10'$C$-methano-1',4',5',6',7',8',9',10'$B$-octahydronaphth-2'-yl)-acetic acid which may be further purified by recrystallization from acetone:hexane.

In like manner, the foregoing procedure is used to prepare the 6'-oxo compound corresponding to the products of Example 9 and the reduced ethanol derivative thereof via its selectively protected ethanol hydroxyl.

EXAMPLE 12

A mixture of 1 g. of the (6'-oxo-9',10'-methano-1',4',5',6',7',8',9',10'-octahydronaphth-2'-yl)acetic acid, 15 ml. of acetic anhydride and 0.2 g of sodium acetate is refluxed for one hour. The reaction mixture is then poured into dilute sodium bicarbonate solution to hydrolyze any excess anhydride. This mixture is extracted with methylene chloride. The methylene chloride extracts are combined, washed, dried evaporated and chromatographed to give the (6'-acetoxy-9',10'-methano-1',4',5',8',9',10'$B$-hexahydronaphth-2'-yl)acetic acid.

In like manner, the other enol esters of the present invention can be prepared by the use of the appropriate carboxylic acid anhydride, such as the propionate, butyrate, valerate, and the like.

EXAMPLE 13

A mixture of 3 g. of the (6'-oxo-9',10'-methano-1',4'-5',6',7',8',9',10'$B$-octahydronaphth-2'-yl)acetic acid, about 2 equivalents of zinc powder and 200 ml. of dry tetrahydrofuran are stirred for about two hours at 50°–60°C. Stirring is continued until formation of zinc enolate is complete as checked by thin layer chromatography. The mixture is allowed to stand and cool and then decanted under anhydrous conditions. To the thus-obtained solution there is added about 50 ml. of dimethyl sulfate and the mixture stirred. The reaction mixture is then allowed to stand at room temperature until formation of the enol ether is complete as checked by thin layer chromatography. The reaction mixture is then poured into water. This mixture is extracted with methylene chloride. The methylene chloride extracts are washed, dried, and evaporated and chromatographed to give the (6'-methoxy-9',10'-methano-1',4',5',8',9',10'$B$-hexahydronaphth-2'-yl)acetic acid.

In like manner, the other enol esters of the present invention can be prepared, such as the ethoxy, propyloxy, butyloxy, and the like.

EXAMPLE 14

(6'-Acetoxy-9',10'-methano-1',4',5',8',9',10'-hexahydronaphth-2'-yl)acetic acid methyl ester (200 mg.) is dispersed in 6 ml. of dioxane at room temperature with stirring. To the resultant mixture is added 1 gram of 2,3-dichloro-5,6-dicyano-1,4-benzoquinone with stirring while cooling the reaction mixture to 25°C. The resultant mixture is heated to the boiling point and maintained under reflux conditions for 4 hours. After this time, the solution is cooled and poured into ethyl acetate. The resultant mixture is filtered and the filtrate is washed twice with water, dried over magnesium sulfate, filtered through 10 gm. neutral alumina and evaporated to provide the 8-acetoxy-1,6-methano-[10]-annulene-3-acetic acid methyl ester product. This product can also be referred to as (1',6'-methano-8'-acetoxycyclodecapentaen-3'-yl)acetic acid.

In like manner, the other enol esters and ethers of the present inventions (see Examples 12 and 13) are converted to the corresponding annulene products e.g. the methyl esters of 8-methoxy-1,6-methano-[10]-annulen-3-acetic acid,
8-butyloxy-1,6-difluoromethano-[10]-annulen-3-acetic acid,
2-(8-methoxy-1,6-difluoromethano-[10]-annulen-3-yl) ethanol,
8-propionyloxy-1,6-dichloromethano-[10]-annulen-3-acetic acid,
8-propionyloxy-1,6-methano-[10]-annulen-3-acetic acid,
8-ethoxy-1,6-methano-[10]-annulen-3-acetic acid,
2-(8-propyloxy-1,6-methano-[10]-annulen-3-yl)-ethanol,
2-(8'-ethoxy-1',6'-methano-[10]-annulen-3-yl)propionic acid,
2-(8'-methoxy-1',6'-methano-[10]-annulen-3-yl)propionic acid, and
2-(8'-acetoxy-1',6'-difluoromethano-[10]-annulen-3-yl)propionic acid.

EXAMPLE 15

The procedures of Examples 8, 9, and 10 are performed upon the 6-unsubstituted, -lower alkyl, and -monocyclic lower alkyl compounds of Examples 1, 2, and 3 to prepare the corresponding 9',10'-bridged-1',4',5',8',9',10'-hexahydro-naphthalene methyl ester compounds. These compounds are subjected to treatment with benzoquinone as described in Example 14 to prepare, for example, the methyl esters (1',6'-methano-[10]-annulen-3-yl)acetic acid, (1,6-dichloromethano-[10]-annulen-3-yl)acetic acid, (1,6-dichloromethano-[10]-annulen-3-yl)acetic acid, (1,6-difluoro-[10]-annulen-3-yl)acetic acid, and the various 8-substituted compounds, e.g. (8-methyl-1,6-methano-[10]-annulen-3-yl)acetic acid, (8-ethyl-1,6-difluoromethano-[10]-annulen-3-yl)acetic acid, 8-propyloxy-1,6-difluoromethano-[10]-annulen-3-yl)acetic acid, (8-cyclopropyl-1,6-methano-[10]-annulen-3-yl acetic acid and the like.

EXAMPLE 16

2-(9',10'-Dichloromethano-1',4',5',8',9',10'-hexahydronaphth-2'-yl)propionic acid methyl ester (1 gram) is dispersed in 50 ml. of dioxane at room temperature. To the resultant mixture are added 5 grams of 2,3-dichloro-5,6-dicyano-1,4-benzoquinone at room temperature with stirring. The reaction mixture is then heated to the boiling point and maintained under reflux conditions for 6 hours. The reaction mixture is then chromatographed on 25 gm. of silica gel eluting with ether-hexane to provide the 2-(1',6'-dichloromethano-2',5'-dihydro-[10]-annulen-3'-yl)propionic acid.

2-(1',6'-dichloromethano-2',5'-dihydro-[10]-annulen-3-yl)-propionic acid (67 mg. ) is dispersed in 15 ml. of methylene chloride at room temperature. The resultant solution is cooled to −80°C. and, when arriving at this temperature, 1 molar equivalent of bromine dispersed in 1.8 ml. of methylene chloride is slowly added thereto. After 10 minutes, the solution is evaporated and the residue recrystallized from ether methanol (1:1) to provide the 2-(1',6'-dichloromethano-3',4'-dibromo-[10]-annulen-3'-yl)propionic acid which is dispersed in 6 ml. of dimethylformamide at room temperature with stirring. To the resultant solution is added 0.2 ml. of diazabicyclononene. After allowing this reaction mixture to stand for 3 days at room temperature, the solution is poured into water, acidified with dilute HCl and extracted with ether. The ether extracts are isolated and washed three times with water, and the washed material dried over magnesium sulfate and evaporated to provide the 2-(1',6'-dichloromethano-[10]-annulen-3-yl)propionic acid product.

EXAMPLE 17

2-(6'-methyl-9',10'-difluoromethano-1',4',5',8'-tetrahydronaphth-2'-yl)propionic acid methyl ester (1 g.) is added to 10 ml. of dioxane at room temperature with stirring. The resultant mixture is maintained at 25°C. and one chemical equivalent of tetrachloro-1,4-benzoquinone is added thereto with stirring. The temperature of the reaction mixture is then raised to the boiling point and maintained under reflux for 6 hours after which time it is poured into ethyl acetate. The resultant mixture is washed with water and filtered through neutral alumina. The filtrate is washed with water, dried and evaporated to provide the methyl ester of 2-(8'-methyl-1',6'-difluoromethyl-2',5'-dihydro-[10]-annulen-3'-yl)propionic acid.

EXAMPLE 18

The product prepared as described in Example 17 is treated with bromine and the resultant compound dehydrobrominate as set forth in Example 16 above to prepare the 2-(8'-methyl-1',6'-difluoromethano-[10]-annulen-3'-yl)-propionic acid product.

EXAMPLE 19

The procedure of Example 17 is repeated using about two chemical equivalents of tetrachloro-1,4-benzoquinone to provide the 2-(8'-methyl-1',6'-dichloromethano-[10]-annulen-3'-yl)propionic acid product, preferably after hydrolysis from the methyl ester.

EXAMPLE 20

In accordance with the foregoing methods, the respective starting compounds set forth in Column A below are reacted with the respective reactants set forth in Column B below to provide the respective product set forth in Column C below.

A 2-(1',1'-dimethyl-2'-hydroxyethyl)-9,10-methano-1,4,5,8,9,10-hexahydronaphthalene,
2-(1'-ethyl-1'-methyl-2'-acetoxyethyl)-9,10-dichloromethano-1,4,5,8,9,10-hexahydronaphthalene,
2-(1'-ethyl-1'-methyl-2'-carbamoylethyl)-9,10-methano-1,4,5,8,9,10-hexahydronaphthalene,
1-carbopropoxymethyl-9,10-difluoromethano-1,4,5,8,9,10-hexahydronaphthalene,
1-(2'-hydroxyethyl)-9,10-methano-1,4,5,8,9,10-hexahydronaphthalene, 2-(2'-n-butoxyethyl)-9,10-dichloromethano-1,4,5,8,9,10-hexahydronaphthalene, 2-carboxymethyl-9,10-methano-1,4,5,8,9,10-hexahydronaphthalene, 1,4-benzophenone, 2,3-dichloro-5,6-dicyano-1,4-benzoquinone,

B 1,2-benzoquinone,
   tetrachloro-1,2-benzoquinone,
   tetrachloro-1,4-benzoquinone,
   2,3-difluoro-1,2-benzoquinone,
   2,3-difluoro-1,4-benzoquinone,
   2,3-dicyano-1,2-benzoquinone,
   2,3-dicyano-1,4-benzoquinone,
   2,3-dichloro-5,6-dicyano-1,4-benzoquinone,

C 3-(1',1'-dimethyl-2'-hydroxyethyl)-1,6-methano-[10]-annulene, 3-(1'-ethyl-1'-methyl-2'-acetoxyethyl)-1,6-dichloromethano-[10]-annulene, 3-(1'-ethyl-1'-methyl-2'-carbamoylethyl)-1,6-methano-[10]-annulene, 3-carbopropoxymethyl-1,6-difluoromethano-[10]-annulene, 2-formyl-1,6-methano-[10]-annulene, 3-(2'-n-butoxyethyl)-1,6-dichloromethano-[10]-annulene, 3-carboxyethyl-1,6-methano-[10]-annulene.

The following examples serve to indicate the manner by which the product compounds of the present invention can be further elaborated.

EXAMPLE 21

A solution of 1 g. of 3-carbomethoxymethyl-1,6-methano-[10]-annulene in 50 ml. of tetrahydrofuran is added over 30 minute period to a stirred suspension of 1 g. of lithium aluminum hydride in 50 ml. of anhydrous tetrahydrofuran and this mixture is heated at reflux for 2 hours. To the mixture are cautiously added 5 ml. of ethyl acetate and 2 ml. of water. Sodium sulfate is next added, the mixture is filtered and the solid thus collected is washed with hot ethyl acetate. The combined organic solutions are then evaporated to yield 1,6-methano-3-(2'-hydroxyethyl)-[10]-annulene which may be further purified through recrystallization from acetone:hexane.

EXAMPLE 22

A mixture of 1 g. of 1,6-methano-3-(2'-hydroxyethyl)-[10-]-annulene 1 g. of p-toluenesulfonic acid monohydrate 50 ml. of acetic acid and 25 ml. of acetic anhydride is allowed to stand at room temperature for 24 hours, and then it is poured into water and stirred. This mixture is then extracted with methylene chloride and these extracts are dried and evaporated to yield 1,6-methano-3-(2'-acetoxyethyl)-[10]-annulene which is recrystallized from acetone:ether.

In like manner, the other hydroxy containing annulene products prepared in accordance with the above methods are converted to the corresponding acetate esters. Further, the foregoing method can be used with alternative carboxylic acid anhydrides so as to prepare the corresponding alternate carboxylate acid esters of the hydroxy containing annulene products hereof, for example, the propionate, the butyrates, the valerates, the caproates, the enanthates, and the caprylates.

EXAMPLE 23

Two milliliters of dihydropyran are added to a solution of 1 g. of 1,6-methano-3-(2'-hydroxyethyl)-[10]-annulene in 15 ml. of benzene. About 1 ml. is removed by distillation to remove moisture and 20 mg. of p-toluenesulfonyl chloride is added to the cooled solution. This mixture is allowed to stand at room temperature for 4 days, and is then washed with aqueous sodium carbonate solution and water, dried and evaporated. The residue is chromatographed on neutral alumina, eluting with ether:hexane to yield 1,6-methano-3-(2'-tetrahydropyran-2'-yloxyethyl)-[10]-annulene which is recrystallized from ether-hexane.

In like manner, the foregoing method can be utilized substituting dihydrofuran for dihydropyran so as to prepare the corresponding tetrahydrofuran-2'-yloxy compound. Similarly, the foregoing method can be used with the other hydroxy annulene products hereof so as to prepare the corresponding ethers thereof.

EXAMPLE 24

A solution of one chemical equivalent of 1,6-methano-3-(2'-hydroxyethyl)-[10]-annulene in 30 ml. of benzene is heated to reflux and about 2 ml. removed by distillation to eliminate moisture. The mixture is cooled to room temperature and one chemical equivalent of sodium hydride are added, followed by the dropwise addition of two chemical equivalents of cyclopentyl bromide in 10 ml. of benzene over a period of 20 minutes. The mixture is allowed to reflux for 20 hours after which time the precipitate of sodium bromide is removed by filtration and the organic phase dried and evaporated to yield 1,6-methano-3-(2'-cyclopentyloxyethyl)-[10]-annulene which is further purified upon recrystallization from pentane.

The foregoing method can be performed upon the other corresponding annulene products hereof so as to prepare the corresponding cyclopentyloxy compounds.

EXAMPLE 25

A solution of 1 g. of 1,6-difluoromethano-3-carboethoxy-methyl-[10]-annulene in 50 ml. of ethylene glycol is heated at reflux for 3 hours with a solution of potassium hydroxide in 1 ml. of water. The reaction mixture is then poured into ice water and the solid which forms is collected by filtration, washed with water to neutrality and dried to yield 1,6-difluoromethanocarboxymethyl-[10]-annulene which is recrystallized from methylene chloride:ether.

The foregoing method can be performed upon the other corresponding annulene ester products hereof so as to prepare the corresponding carboxylic acid compounds.

EXAMPLE 26

To a solution of 10 g. of 1,6-difluoromethano-3-carboxymethyl-[10]-annulene in 200 ml. of ethanol is added the theoretical amount of potassium hydroxide dissolved in 200 ml. of 90 percent ethanol. The reaction mixture is then concentrated in vacuum giving the potassium salt of 1,6-difluoromethano-3-carboxymethyl-[10]-annulene.

The foregoing method can be performed upon the other corresponding annulene products hereof so as to prepare the corresponding metal salts thereof.

Similarly, by following analogous procedures, the other metal salts contemplated herein are prepared.

EXAMPLE 27

A solution of 10 g. of 3-carboxymethyl-8-methoxy-1,6-dichloromethano-[10]-annulene in 50 ml. of thionyl chloride is heated at reflux for 1 hour. Thereafter, the solution is evaporated to dryness to give the corresponding acid chloride to which is added a concentrate ethereal ammonia solution. The resultant solution is evaporated giving the amides of 1,6-dichloromethano-3-carboxymethyl-8-methoxy-[10]-annulene.

The foregoing method can be performed upon the other corresponding annulene products hereof so as to prepare the corresponding carboxylic acid amide compounds.

EXAMPLE 28

Two grams of (1,6-methano-8-acetoxy-[10]-annulen-3-yl) acetic acid in 20 ml. of diethyl ether is added to an ethereal solution of 1.2 molar equivalents of diazomethane. The resulting mixture is allowed to stand at 0°C. for about one hour and then is evaporated under reduced pressure to yield the methyl ester of 1,6-methano-3-carbomethoxymethyl-8-acetoxy-[10]-annulene.

EXAMPLE 29

A solution of 6 g. of 1,6-difluoromethano-3-(2'-hydroxy-ethyl)-[10]-annulene in 120 ml. of pyridine is added to a mixture of 6 g. of chromic trioxide in 20 ml. of pyridine. The reaction mixture is allowed to stand at room temperature for 15 hours, diluted with ethyl acetate and filtered through Celite diatomaceous earth. The filtrate is washed well with water, dried and evaporated to dryness to yield 1,6-difluoromethano-3-formylmethyl-[10]-annulene.

EXAMPLE 30

A mixture of 3 g, of methyl 2-(8'-methoxy-1',6'-difluoromethano-[10]-annulen-3'-yl), one molar equivalent of sodium methoxide, one molar equivalent of hydroxylamine hydrochloride and 50 ml. of methanol is allowed to stand for about 16 hours. The mixture is then filtered and the filtrate evaporated. The residue is neutralized by the addition of aqueous 1N hydrochloric acid and extracted with ether. The ether extracts are combined, washed with water, dried and evaporated to yield 2-(8'-methoxy-1',6'-difluoromethano-[10]-annulen-3'-yl)-propionyl hydroxamic acid.

The following examples illustrate the method by which the α-carbon atom can be elaborated.

EXAMPLE 31

(1,6-Methano-[10]-annulen-3-yl)-acetic acid methyl ester (0.05M) is dissolved in dimethyl sulfoxide (25 ml.) containing sodium methoxide (0.05M) and formaldehyde gas is passed in until an increase in weight of 3 grams has occurred. The mixture is stirred at room temperature for 6 hours and then 50 ml. of dilute HCl is added. The solution is extracted with ether and the extracts are washed, dried and evaporated to give 2-(1',6'-methano-[10]-annulen-3-yl)-acrylic acid methyl ester.

The foregoing methyl ester can be hydrolyzed via the method known per se such as with the aqueous sodium hydroxide to provide the corresponding acrylic acid compound.

EXAMPLE 32

A mixture of 7 g. of methylene iodide and 3 g. of zinc-copper couple in 15 ml. of anhydrous ether is heated at reflux under nitrogen for 3 hours. The mixture is then cooled and 2 g. of 2-(1',6'-methano-[10]-annulen-3'-yl)-acrylic acid methyl ester are added. This mixture is refluxed for 2 hours and is then poured into 200 ml. of 2 percent aqueous sodium carbonate and extracted twice with 100 ml. portions of ether. These extracts are dried over sodium sulfate and evaporated under reduced pressure. The residue is held at 0.01 mm. to remove any unreacted methylene iodide and then recrystallized from hexane to yield 1,6-methano-3-(1',1'-ethylenecarbomethoxymethyl)-[10]-annulene.

EXAMPLE 33

(1,6 Methano-[10]-annulen-3-yl)-acetic acid methyl ester (0.1 M) is dissolved in glyme (100 ml.) and sodium hydride (0.1 M) is added followed by 1,4-dibromobutane (0.1M). The mixture is heated to 90°C. for four hours and then a further 0.1 M sodium hydride is added. The mixture is heated to 90°C. for a further three hours, and then is cooled. One liter of water is added to the resultant mixture and the solution is extracted with ether. The extracts are washed, dried and evaporated to give 1,6-methano-3-(1',1'-butylene carbomethoxymethyl)-[10]-annulene.

Upon base hydrolysis the corresponding acid is prepared. By substituting 1,3-dibromopropane and 1,5-dibromopentane for 1,4-dibromobutane in the above, the corresponding 1',1'-propylene and 1',1'-pentylene products are respectively prepared.

EXAMPLE 34

To a mixture of 22 grams of the methyl ester of 1,6-methano-3-(1'-carbomethoxymethyl-[10]-annulene, 1 equivalent of sodium hydride and 150 ml. of 1,2-dimethoxyethane, there is added one equivalent of methyl iodide. The reaction mixture is allowed to stand for several hours and then diluted with ethanol and water. Mixture is then extracted with methylene chloride. The methylene chloride extracts are combined washed and dried and evaporated to give 1,6-methano-3-(1'-carbomethoxyeth-1'-yl)-[10]-annulene.

The foregoing procedure is repeated using two equivalents each of sodium hydride and methyl iodide so as to prepare the corresponding 1,6-methano-3-(2'-carbomethoxyprop-2'-yl)-[10]-annulene or 2-(1',6'-methano-[10]-annulen-3'-yl)-isobutyric acid.

By substituting other lower alkyl iodides for methyl iodide in the above procedures, there are prepared the corresponding alkylated products for example,
2-(1',6'-methano-[10]-annulen-3'-yl)-butanoic acid,
2-ethyl-2-(1',6'-methano-[10]-annulen-3'-yl)-butanoic acid,
2-(1',6'-methano-[10]-annulen-3'-yl)-pentanoic acid, and the like.

EXAMPLE 35

A solution of 10 g. of 2-naphthylacetic acid in 100 ml. of ethanol:ether (1:1) is added to 15 g. of sodium in 500 ml. of liquid ammonia at −78°. After about 1 hour, excess sodium is destroyed by the addition of ammonium chloride and about 50 ml. of water is added. The reaction mixture is then allowed to rise to room temperature and then about 200 ml. of water followed by about 400 ml. of ether is added. The ether layer is separated, washed, dried over magnesium sulfate and evaporated to give 1,4,5,8-tetrahydro-2-naphthylacetic acid which can be purified by recrystallization from aqueous methanol.

By repeating the above procedure using 2-(6'-methoxy-2'-naphthyl)ethanol as the starting material, there is obtained 2-(6'-methoxy-1',4',5',8'-tetrahydro-2'-naphthyl) ethanol.

EXAMPLE 36

A. A solution of 1 g. of 1,4,5,8-tetrahydro-2-naphthylacetic acid in dry tetrahydrofuran is refluxed for about 48 hours with a molar excess of lithium aluminum hydride. The reaction mixture is diluted with water and ethyl acetate. The ethyl acetate layer is separated, washed, dried and evaporated to give 2-(1',4',5',8'-tetrahydro-2'-naphthyl)ethanol.

B. A mixture of 1 g. of the above compound, 4 ml. of pyridine and 4 ml. of acetic anhydride is allowed to stand at room temperature for 15 hours. The mixture is then poured into water and extracted several times with ethyl acetate. The ethyl acetate extracts are combined, washed with dilute hydrochloric acid and water, dried and evaporated to give the acetate of 2-(1',4',5',8'-tetrahydro-2'-naphthyl)ethanol.

The procedure of Part A above is repeated using 6-metnoxy-2-naphthylacetic acid as the starting material and there is obtained 2-(6'-methoxy-2'-naphthyl)ethanol.

As an alternative to the procedure of Part A of this example, prior to reduction, the acid can be converted into the methyl ester as by treatment with diazomethane or the like, and the thus-obtained methyl ester then converted into the alcohol by treatment with lithium aluminum hydride at about room temperature for about two hours.

EXAMPLE 37

A. A solution of 5 g. of the acetate of 2-(1',4'-5',8'-tetrahydro-2'-naphthyl)ethanol in 100 ml. of diglyme heated to about 135°, there is added slowly a solution of 1.5 equivalents of sodium trichloroacetate in 100 ml. of diglyme over a period of about 1 hour. The reaction mixture is then allowed to cool to about room temperature and is then diluted with water and ethyl acetate. The ethyl acetate layer is separated, washed, dried over magnesium sulfate and evaporated to give a mixture containing the acetate of 2-(9',10'-dichloromethylene-1',4',5',8',9',10'-hexahydro-2'-naphthyl)ethanol which is separated by chromatography.

By using sodium chlorodifluoroacetate in place of sodium trichloroacetate in the above procedure, there is obtained the acetate of 2-(9',10'-difluoromethylene-1',4',5',8'9',10'-hexahydro-2'-naphthyl)ethanol.

B. A solution of 0.75 g. of the acetate of 2-(9',10'-dichloromethylene-1',4',5',8',9',10'-hexahydro-2'-naphthyl)-ethanol in 50 ml. of ether is added to a solution of 500 mg. of sodium in 150 ml. of liquid ammonia with stirring. After 2 hours, ammonium chloride is added until the blue color is discharged and the ammonia allowed to evaporate. Extraction with ether affords 2-(9',10'-methylene-1',4',5',8',9',10'-hexahydro-2'-naphthyl)ethanol which can be further purified by chromatography.

EXAMPLE 38

A. Two milliliters of dihydropyran are added to a solution of 1 g. of 2-(9',10'-methylene-1',4',5',8',9',10'-hexahydro-2'-naphthyl)ethanol in 15 ml. of benzene. About 1 ml. is removed by distillation to remove moisture and 10 mg. of p-toluenesulfonic acid is added to the cooled solution. This mixture is allowed to stand at room temperature for 4 days, and then washed with aqueous sodium carbonate solution an water, dried and evaporated. The residue is chromatographed on neutral alumina, eluting with hexane, to afford the tetrahydropyran-2''-yl ether of 2-(9',10'-methylene-1',4',5',8',9',10'-hexahydro-2'-naphthyl) ethanol.

B. To a solution of 1 g. of the above tetrahydropyran-2''-yl ether in 100 ml. of carbon tetrachloride containing a trace of pyridine, there is added 2 molar equivalents of bromine in 50 ml. of carbon tetrachloride. The reaction mixture is allowed to stand at room temperature for about 20 hours. The reaction mixture is washed, dried and evaporated to give the tetrahydropyran-2''-yl ether of 2-(2',3',6',7'-tetrabromo-9',10'-methylenedecahydro-2'-naphthyl)-ethanol.

One gram of the above 2,3,6,7-tetrabromo compound is dissolved in 15 ml. of dry tetrahydrofuran and then about 4 g. of potassium t-butoxide is added. The reaction mixture is stirred for about 3 hours and then it is diluted with water and ether. The ether layer is separated, washed, dried and evaporated to give the tetrahydropyran-2''-yl ether of 2-(1',6'-methanocyclodecapentaen-3'-yl)ethanol.

EXAMPLE 39

A. To a solution of 1 g. of the tetrahydropyran-2''-yl ether of 2-(1',6'-methanocyclodecapentaen-3'-yl)ethanol in 30 ml. of acetic acid is added 0.5 ml. of 2N hydrochloric acid. The mixture is allowed to stand about 5 hours at room temperature and then diluted with water and extracted with methylene chloride. The methylene chloride extracts are washed with water to neutrality, dried and evaporated to afford 2-(1',6'-methanocyclodecapentaen-3'-yl)ethanol.

B. A mixture of 1 g. of 2-(1',6'-methanocyclodecapentaen-3'-yl)ethanol and 50 ml. of pyridine is added to a mixture of 1 molar equivalent of chromium trioxide in 20 ml. of pyridine. The reaction mixture is allowed to stand at room temperature for 15 hours, diluted with ethyl acetate and filtered. The filtrate is washed well with dilute hydrochloric acid and water, dried and evaporated to give 2-(1',6'-methanocyclodecapentaen-3'-yl)ethanal [1,6-methanocyclodecapentaen-3-ylacetaldehyde].

C. The procedure of Part B is repeated using the above prepared aldehyde as the starting material and there is obtained 1,6-methanocyclodecapentaen-3-ylacetic acid.

EXAMPLE 40

The procedure of Example 38 (Part B) is repeated using the acetate of 2-(9',10'-dichloromethylene-1',4',5',8',9',10'-hexahydro-2'-naphthyl)ethanol and the acetate of 2-(9',10'-difluoromethylene-1',4',5',8',9',10'-hexahydro-2'-naphthyl)-ethanol as the starting material in place of the tetrahydropyran-2''-yl ether of 2-(9',10'-methylene-1',4',5',8',9',10'-hexahydro-2'-naphthyl)ethanol and there is obtained 2-(1',6'-dichloromethanocyclodecapentaen-3'-yl)ethanol and 2-(1',6'-difluoromethanocyclodecapentaen-3'-yl)ethanol, respectively.

By repeating the procedure of Example 39 (Part B) using 2-(1',6'-dichloromethanocyclodecapentaen-3'-yl)ethanol and 2-(1',6'-difluoromethanocyclodecapentaen-3'-yl)ethanol as the starting material, there is obtained 2-(1',6'-dichloromethanocyclodecapentaen-3'-yl)ethanal and 2-(1',6'-difluoromethanocyclodecapentaen-3'-yl)ethanal, respectively, which are subjected to the procedure of Example 38 (Part C) to afford the corresponding acids, i.e. 1,6-dichloromethanocyclodecapentaen-3-ylacetic acid and 1,6-difluoromethanocyclodecapentaen-3-ylacetic acid, respectively.

EXAMPLE 41

To a solution of 1 g. of 1,6-methanocyclodecapentaen-3-ylacetic acid in 25 ml. of ethanol, there is added with stirring an aqueous solution of a molar equivalent of potassium bicarbonate. This mixture is stirred until the evolution of carbon dioxide ceases and then the mixture is evaporated to furnish the potassium salt of 1,6-methanocyclodecapentaen-3-ylacetic acid.

By using sodium bicarbonate in the above procedure, the corresponding sodium salt is obtained.

Alternatively, salts can be prepared by titrating a solution of the free acid with an alcohol solution of the appropriate alkali metal alkoxide to neutrality.

EXAMPLE 42

A mixture of 1 g. of the sodium salt of 1,6-methanocyclodecapentaen-3-ylacetic acid, 3 ml. of methyl iodide and 20 ml. of dimethylacetamide is stirred in the dark for 5 hours. Excess methyl iodide is removed by evaporation under reduced pressure. The mixture is then poured into water and extracted several times with ether. The ether extracts are combined, washed, dried and evaporated to give the methyl ester of 1,6-methanocyclodecapentaen-3-ylacetic acid.

By using other lower alkyl iodides in place of methyl iodide in the above procedure, the corresponding lower alkyl esters are obtained.

Alternatively, the free acids can be converted into lower alkyl esters by treatment with a lower diazoalkane such as diazomethane, diazoethane, and the like, in ether for a few hours.

EXAMPLE 43

To a mixture of 22 g. of the methyl ester of 1,6-methanocyclodecapentaen-3-ylacetic acid, 2.5 g. of sodium hydride and 150 ml. of 1,2-dimethoxyethane, there is added 25 g. of methyl iodide. The reaction mixture is allowed to stand for several hours and is then diluted with ethanol and water. The mixture is then extracted with methylene chloride. The methylene chloride extracts are combined, washed, dried and evaporated to give the methyl ester of 2-(1',6'-methanocyclodecapentaen-3'-yl)propionic acid.

EXAMPLE 44

A mixture of 25 g. of the methyl ester of 2-(1',6'-methanocyclodecapentaen-3'-yl)propionic acid, 15 g. of sodium carbonate, 200 ml. of methanol and 25 ml. of water is allowed to stand for 24 hours. The reaction mixture is acidified by the addition of dilute HCl and then extracted with methylene chloride. The methylene chloride extracts are combined, washed, dried and evaporated to give 2-(1',6'-methanocyclodecapentaen-3'-yl)propionic acid.

EXAMPLE 45

A mixture of 2 g. of 2-(6'-methoxy-1',4',5',8'-tetrahydro-2'-naphthyl)ethanol and 35 ml of methanol is heated to reflux and 3.5 of acetic acid added. This mixture is refluxed for about 15 minutes and then allowed to cool. The mixture is then diluted with water and extracted with methylene chloride. The methylene chloride extracts are combined and then washed, dried and evaporated to give 2-(6'-oxo-1',4',5',6',7',8'-hexahydro-2'-naphthyl)ethanol which is converted into 2-(6'-oxo-9',10'-dichloromethylene-1',4',5',6',7',8',9',10'-octahydro-2'-naphthyl)ethanol and 2-(6'-oxo-9',10'A-difluoromethylene-1',4',5',6',7',8',9',10'B-octahydro-2'-naphthyl)ethanol using the procedure of Example 37 (Part A).

EXAMPLE 46

By subjecting 2-(6'-oxo-9',10'-dichloromethylene-1',4',5',6',7',8',9',10'-octahydro-2'-naphthyl)ethanol to the procedure of Example 38 (Part A), there is obtained the tetrahydropyran-2''-yl ether of 2-(6'-oxo-9',10'-dichloromethylene-1',4',5',6',7',8',9',10'-octahydro-2'-naphthyl) ethanol which is converted into the tetrahydropyran-2''-yl ether of 2-(6'-hydroxy-9',10'-methylene-1',4',5',6',7',8',9',10'-octahydro-2'-naphthyl)-ethanol using the procedure of Example 37 (Part B). The thus obtained 6'-hydroxy derivative is oxidized using the procedure of Example 39 (Part B) to give the tetrahydropyran-2''-yl ether of 2-(6''-oxo-9',10'-methylene-1',4',5',6',7',8',9',10'-octahydro-2'-naphthyl) ethanol.

EXAMPLE 47

A mixture of 2.0 g. of the tetrahydropyran-2''-yl ether of 2-(6'-oxo-9',10'-methylene-1',4',5',6',7',8',9',10'-octahydro-2'-naphthyl)ethanol, 2.3 g. of cupric bromide and 200 ml. of methanol is refluxed for 24 hours. The reaction mixture is poured into water and the resulting mixture extracted with chloroform. The organic extracts are dried over magnesium sulfate and evaporated. The residue is chromatographed on silica gel to give the tetrahydropyran-2''-yl ether of 2-(6'-oxo-7'-bromo-9',10'-methylene-1',4',5',6',7',8',9',10'-octahydro-2'-naphthyl)ethanol.

A mixture of 1 g. of the above 7-bromo compound, 1.2 g. of lithium bromide and 100 ml. of dimethylformamide is stirred at about 90° for 20 hours. The reaction mixture is poured into water and extracted with ether. The ether extracts are washed well with water, dried and evaporated. The residue is chromatographed on alumina to yield the tetrahydropyran-2''-yl ether of 2-(6'-oxo-9',10'-methylene-1',4',5',6',9',10'-hexahydro-2'-naphthyl)ethanol.

As an alternative to the above procedure, the 7,8-dehydro of the tetrahydropyran-2''-yl ether of 2-(6'-oxo-9',10'-methylene-1',4',5',6',7',8',9',10'-ocathydro-2'-naphthyl)-ethanol can be prepared by dehydrogenation using 2,3-dichloro-5,6-dicyano-1,4-benzoquinone in dioxane under reflux conditions.

EXAMPLE 48

A mixture of 1 g. of the tetrahydropyran-2''-yl ether of 2-(6'-oxo-9',10'-methylene-1',4',5',6',9',10'-hexahydro-2'-naphthyl)ethanol, 15 ml. of acetic anhydride and 0.2 g. of sodium acetate is refluxed for 1 hour. The reaction mixture is then poured into dilute sodium bicarbonate solution to hydrolyze any excess anhydride. This mixture is extracted with methylene chloride. The methylene chloride extracts are combined, washed, dried and evaporated to give the tetrahydropyran-2''-yl ether of 2-(1',6'-methano-8'-acetoxycyclo-decatetraen-3'-yl)ethanol.

EXAMPLE 49

A mixture of 2 g. of the tetrahydropyran-2''-yl ether of 2-(1',6'-methano-8'-acetoxycyclodecatetraen-3'-yl)ethanol and 1 molar equivalent of N-bromosuccinimide in 100 ml. of carbon tetrachloride is refluxed for about 1.5 hours. The mixture is cooled and filtered. The filtrate is concentrated and to the residue there is added 0.5 g. of calcium carbonate and 25 ml. of dimethylformamide. The reaction mixture is heated at reflux for about 30 minutes and then cooled. The mixture is filtered and filtrate evaporated to give the tetrahydropyran-2''-yl ether of 2-(1',6'-methano-8'-acetoxycyclodecapentaen-3'-yl)ethanol which is purified by chromatography.

The tetrahydropyran-2''-yl ether of 2-(1',6'-methano-8'-acetoxycyclodecapentaen-3'-yl)ethanol is subjected to the procedures of Example 39 to give 2-(1',6'-methano-8'-acetoxycyclodecapentaen-3'-yl)ethanol, 2-(1',6'-methano-8'-acetoxycyclodecapentaen-3'-yl)ethanal, and 1,6-methano-8-acetoxycyclodecapentaen-3-ylacetic acid, respectively.

EXAMPLE 50

One gram of the tetrahydropyran-2''-yl ether of 2-(1',6'-methano-8'-acetoxycyclodecapentaen-3'-yl)ethanol is allowed to stand at room temperature for 15 hours with 1 g. of potassium bicarbonate in 10 ml. of water and 90 ml. of methanol. The reaction mixture is and 48, there is obtained the tetrahydropyran-2''-yl ether of 2'-(1',6'-dichloromethano-8'-acetoxycyclodecatetraen-3'-yl)-ethanol and the tetrahydropyran-2''-yl ether of 2-(1',6'-difluoromethano-8'-acetoxycyclodecatetraen-3'-yl) ethanol, respectively, which a further treated according to the procedures of Example 49 to give the tetrahydropyran-2''-yl ether of 2-(1',6'-dichloromethano-8'-acetoxycyclodecapentaen-3'-yl)ethanol, 2-(1',6'-dichloromethano-8'-acetoxycyclodecapentaen-3'-yl)-ethanol, 2-(1',6'-dichloromethano-8'-acetoxydecapentaen-3'-yl)ethanol, and 1,6-dichloromethano-8-acetoxycyclodecapentaen-3-ylacetic acid and the tetrahydropyran-2''-yl ether of 2-(1',6'-difluoromethano-8'-acetoxycyclodecapentaen-3'-yl)ethanol, 2-(1',6'-difluoromethano-8'-acetoxycyclodecapentaen-3'-yl)ethanol, 2-(1',6'-difluoromethano-8'-acetoxycyclodecapentaen-3'-yl)-ethanal, and 1,6-difluoromethano-8-acetoxycyclodecapentaen-3-ylacetic acid, respectively.

By repeating Example 50 using as the starting material the tetrahydropyran-2''-yl ether of 2-(1',6'-dichloromethano-8'-acetoxycyclodecapentaen-3'-yl)ethanol and the tetrahydropyran-2''-yl ether of 2-(1',6'-difluoromethano-8'-acetoxycyclodecapentaen-3'-yl)ethanol, there is obtained 2-(1',6'-dichloromethano-8'-methoxycyclodecapentaen-3'-yl)ethanol, 2-(1',6'-dichloromethano-8'-methoxycyclodecapentaen-3'-yl) ethanal and 1,6-dichloromethano-8-methoxycyclodecapentaen-3-ylacetic acid and 2-(1',6'-difluoromethano-8'-methoxycyclodecapentaen-3'-yl)-ethanol, 2-(1',6'-difluoromethano-8'-methoxycyclodecapentaen-3'-yl)ethanal and 1,6-difluoromethano-8-methoxycyclodecapentaen-3-ylacetic acid, respectively.

By using the procedure of Example 42, 1,6-difluoromethano-8-methoxycyclodecapentaen-3-ylacetic acid and 1,6-difluoromethano-8-methoxycyclodecapentaen-3-ylacetic acid are converted into the corresponding methyl ester. The thus-obtained methyl esters are alkylated using the procedure of Example 43 and then hydrolyzed using the procedure of Example 44 to afford 2-(1',6'-dichloromethano-8'-methoxycyclodecapentaen-3'-yl)-propionic acid and 2-(1',6'-difluoromethano-8'-methoxy-cyclodecapentaen-3'-yl)propionic acid, respectively.

EXAMPLE 52

A suspension of 1 g. of 2-(8'-methoxy-1',6'-methano-cyclodecapentaen-3'-yl)propionic acid in 10 ml. of 48 percent aqueous hydrofluoric acid is stirred at 0°C. for about 90 minutes. The reaction mixture is diluted with water and ethyl acetate. The ethyl acetate layer is washed, dried and evaporated to dryness under reduced pressure and the residue chromatographed to give 2-(6'-oxo-9',10'-methylene-5',6',9',10'-tetrahydro-2'-naphthyl)propionic acid.

A mixture of 1 g. of 2-(6'-oxo-9',10'-methylene-5',6',9',10'-tetrahydro-2'-naphthyl)propionic acid, 15 ml. of acetic anhydride and 0.2 g. of sodium acetate is refluxed for about 1 hour. The reaction mixture is then poured into water to hydrolyze any excess anhydride. Thereafter, the mixture is extracted with methylene chloride. The methylene chloride extracts are combined, washed, dried and evaporated to give 2-(8'- then concentrated under reduced pressure and dried. The residue is taken up in about 10 ml. of anhydrous dioxane and to this mixture is added 1 ml. of methylorthoformate and a trace of p-toluenesulfonic acid. The mixture is stirred at room temperature for about 15 minutes and then allowed to stand at room temperature for about 30 minutes. The mixture is diluted with water and shaken and then extracted with methylene chloride. The methylene chloride extracts are combined, washed, dried and evaporated to give 2-(1',6'-methano-8'-methoxycyclo-decapentaen-3'-yl)ethanol which is subjected to the procedures of Example 39 (Parts B and C) to give the corresponding aldehyde and acid.

EXAMPLE 51

By subjecting the tetrahydropyran-2''-yl ether of 2-(6'-oxo-9',10'-dichloromethylene-1',4',5',6',7',8',9',10 octahydro 2'-naphthyl)ethanol and the tetrahydropyran-2''-yl ether of 2-(6'-oxo-9',10'-difluoromethylene-1',4',5',6',7',8',9',10'B-octahydro-2'-naphthyl)ethanol to the processes of Examples 47 acetoxy-1',6'-methanocyclodecapentaen-3'-yl)propionic acid.

By repeating the process of this Example using 2-(8'-methoxy-1',6'-difluoromethanocyclodecapentaen-3'-yl)propionic acid and 2-(8'-methoxy-1',6'-dichloromethanocyclodecapentaen-3'-yl)propionic acid as the starting materials, there is obtained 2-(8'-acetoxy-1',6'-difluoromethanocyclodecapentaen-3'-yl)propionic acid and 2-(8'-acetoxy-1',6'-dichloromethanocyclodecapentaen-3'-yl)propionic acid, respectively.

EXAMPLE 53

2-(6'-methoxy-1',4',5',8'-tetrahydro-1'-naphthyl)-propanol, prepared from 2-(6'-methoxy-1'-naphthyl)propanol using the procedure of Example 35, is converted into 2-(6'-oxo-1',4'5',6',7',8'-hexahydro-1'-naphthyl)propanol which is transformed into 2-(6'-oxo-9',10'-dichloromethylene-1',4',5',6',7',8',9',10'B-octahydro-1'-naphthyl)propanol and 2-(6'-oxo-9',10'-difluoromethylene-1',4',5',6',7',8',9',10'B-octahydro-1'-naphthyl) propanol using the procedures of Example 45.

By subjecting 2-(6'-oxo-9',10'-dichloromethylene-1'-4',5',6',7',8',9',10'-octahydro-1'-naphthyl)propanol to the procedure of Example 38 (Part A), there is obtained the corresponding tetrahydropyran-2''-yl ether which is reduced using the procedure of Example 37 (Part B) to afford the tetrahydropyran-2''-yl ether of 2-(6''-hydroxy-9',10'-methylene-1',4',5',6',7',8',9',10'B-octahydro-1'-naphthyl)propanol which is oxidized using the procedure of Example 39 (Part B) to afford the tetrahydropyran-2''-yl ether of 2-(6'-oxo-9',10'-methylene-1',4',5',6', 7',8',9',10'-octahydro-1'-naphthyl)propanol.

The tetrahydropyran-2''-yl ether of 2-(6'-oxo-9',10'-methylene-1',4',5',6',7',8',9',10'B-octahydro-1'-naphthyl)-propanol is dehydrogenated using the procedure of Example 47 to give the tetrahydropyran-2'''-yl ether of 2-(6'-oxo-9',10'-methylene-1',4',5',6',9',10'-hexahydro-1'-naphthyl)-propanol which is treated according to the methods of Examples 48 and 49 to give the tetrahydropyran-2''-yl ether of 2-(1',6'-methano-8'-acetoxycyclodeca-3',6',8',10'-tetraen-2'-yl)propanol, the tetrahydropyran-2''-yl ether of 2-(1',6'-metnano-8'-acetoxycyclodecapentaen-2'-yl)propanol, 2-(1',6'-methano-8'-acetoxy-cyclodecapentaen-2'-yl)propanol and 2-(1',6'-methano-8'-acetoxycyclodecapentaen-2'-yl)propanol and 2-(1',6'-methano-8'-acetoxycyclodecapentaen-2'-yl)-propionic acid.

2-(6'-methoxy-1'-naphthyl)propanol can be prepared by the alkylation of 6-methoxy-1-naphthylacetic acid to give 2-(6'-methoxy-1'-naphthyl)propionic acid using the procedure of Example 43 followed by reduction with lithium aluminum hydride, or the like, according to the procedure of Example 36.

By subjecting the tetrahydropyran-2''-yl ether of 2-(1',6'-methano-8'-acetoxycyclodecapentaen-2'-yl)propanol to the process of Example 50, there is obtained 2-(1',6'-methano-8'-methoxycyclodecapentaen-2'-yl)propanol which is oxidized to the corresponding aldehyde and acid, i.e. 2-(1',6'-methano-8'-methoxycyclodecapentaen-2'-yl)propanal and 2-(1',6'-methano-8'-methoxycyclodecapentaen-2'-yl)propionic acid, using the procedure of Example 39 (Parts B and C).

EXAMPLE 54

A. The tetrahydropyran-2''-yl ether of 2-(6'-oxo-9',10'-dichloromethylene-1',4',5',6',7',8',9',10'-octahydro-1'-naphthyl)propanol is dehydrogenated using the procedure of Example 47 to obtain the tetrahydropyran-2''-yl ether of 2-(6'-oxo-9',10'-dichloromethylene-1',4',5',6',9',10'-hexahydro-1'-naphthyl)propanol which is subjected to the procedure of Examples 48 and 49 to give the tetrahydropyran-2'''-yl ether of 2-(1',6'-dichloromethano-8'-acetoxycyclodeca-3',6',8',10'-tetraen-2'-yl)propanol, the tetrahydropyran-2''-yl ether of 2-(1',6'-dichloromethano-8'-acetoxycyclodecapentaen-2'-yl)-propanol, 2-(1',6'-dichloromethano-8'-acetoxycyclodecapentaen-2'-yl)propanol, 2-(1',6'-dichloromethano-8'-acetoxycyclodecapentaen-2'-yl)propanol and 2-(1',6'-dichloromethano-8'-acetoxycyclodecapentaen-2'-yl)propionic acid. Using the procedure of Example 50, the thus-obtained 8'-acetoxy compounds can be converted into the corresponding 8'-methoxy compounds.

B. By use of the procedure of Example 37 (Part A), 2-(6'-oxo-1',4',5',6',7',8'-hexahydro-1'-naphthyl)propanol is converted into 2-(6'-oxo-9',10'-difluoromethylene-1',4',5',6',7',8',9',10'B-octahydro-1'-naphthyl)propanol which is etherified using dihydropyran to afford the corresponding tetrahydropyran-2''-yl ether. The tetrahydropyran-2'''-yl ether of 2-(6'-oxo-9',10'-difluormethylene-1',4', 5',6',7',8',9',10'-octahydro-1'-naphthyl)propanol is further processed according to the procedure of Part A of this Example in place of the tetrahydropyran-2''-yl ether of 2-(6'-oxo-9',10'-dichloromethylene-1',4', 5',6',7',8',9',10'-octahydro-1'-naphthyl)propanol and the corresponding 9',10'-difluoromethylene compounds and 1',6'-difluoromethano compounds.

EXAMPLE 55

The process of Example 35 is repeated using 1-naphthyl-acetic acid as the starting material and there is obtained 1,4,5,8-tetrahydro-1-naphthylacetic acid which is converted into the acetate of 2-(1',4',5',8' tetrahydro-1'-naphthyl)-ethanol by the procedure of Example 36. This compound is processed according to the methods of Example 37 to give the acetate of 2-(9',10'-dichloromethylene-1',4',5',8',9',10'-hexahydro-1'-naphthyl)ethanol, the acetate of 2-(9',10'-difluoromethylene-1',4',5',8',9',10'-hexahydro-1'-naphthyl)-ethanol and 2-(9',10'-methylene-1',4',5',8',9',10'-hexahydro-1'-naphthyl)ethanol. The process of Example 38 is then repeated using as the starting material 2-(9',10'-methylene-1',4',5',8',9',10'-hexahydro-1'-naphthyl)ethanol and there is obtained as the final product, the tetrahydropyran-2''-yl ether of 2-(1',6'-methanocyclodecapentaen-2'-yl)ethanol which can be treated according to the procedure of Example 39 to obtain the corresponding free alcohol, aldehyde and acid, i.e. 2-(1',6'-methanocyclodecapentaen-2'-yl)-ethanol, 2-(1',6'-methanocyclodecapentaen-2'-yl)ethanal and 1,6-methanocyclodecapentaen-2-ylacetic acid.

By repeating this example using 2-(1'-naphthyl)propionic acid as the starting material, there is obtained as final products, 2-(1',6'-methanocyclodecapentaen-2'-yl)propanol, 2-(1',6'-methanocyclodecapentaen-2'-yl)propanal and 2-(2-(1',6'-methanocyclodecapentaen-2'-yl)propionic acid. Alternatively, these propanol, propanal, and propionic acid compounds can be prepared by alkylation of the corresponding alkyl ester of 1,6-methanocyclodecapentaen-2-ylacetic acid using the procedure of Example 43 and thereafter hydrolyzing to obtain the free acid and reducing the free acid or alkyl ester (see Example 36) to obtain the alcohol which can then be oxidized to the aldehyde using, e.g. chromium trioxide in pyridine.

EXAMPLE 56

A solution of 1 g. of 2-(8'-methoxy-1',6'-methanocyclodecapentaen-3'-yl)propionic acid, 2 ml. of thionyl chloride in 20 ml. of benzene is held at reflux for about 2 hours. The reaction mixture is cooled and evaporated. The residue is dissolved in anhydrous dioxane and the solution saturated with a stream of anhydrous ammonia. Water is then added after about 20 hours and the mixture evaporated under reduced pressure. The residue is taken up in methylene chloride washed with water dried and evaporated to give 2-(8'-methoxy-1',6'-methanocyclodecapentaen-3'-yl)propionic acid amide.

EXAMPLE 57

A mixture of 1 g. of 2-(8'-methoxy-1',6'-methanocyclo-decapentaen-3'-yl)propanol, 3 ml. of pyridine and 3 ml. of acetic anhydride is allowed to stand at room temperature for about 15 hours. The mixture is then poured into water and extracted with ethyl acetate. The ethyl acetate extracts are combined, washed with dilute hydrochloric acid and water, dried and evaporated to give the acetate of 2-(8'-methoxy-1',6'3'-yl)propanol.

Similarly, by using an equivalent amount of other lower carboxylic anhydrides such as propionic anhydride, n-butyric anhydride, n-caproic anhydride, trimethylacetic anhydride, trichloroacetic anhydride, and the like, in place of acetic anhydride, the corresponding esters are obtained.

EXAMPLE 58

A mixture of 1 g. of the methyl ester of 2-(8'-methoxy-1',6'-methanocyclodecapentaen-3'-yl)propionic acid and 20 ml. of anhydrous tetrahydrofuran is cooled to −75°C. in a dry ice-acetone bath and treated with a previously cooled solution of 0.6 g. of lithium aluminum hydride in 20 ml. of anhydrous tetrahydrofuran. The reaction mixture is then allowed to warm to room temperature and is then heated at reflux for about 15 minutes. The reaction mixture is then cooled and poured into ice water and extracted several times with ethyl acetate. The ethyl acetate extracts are combined, washed with water to neutrality, dried and evaporated to yield 2-(8'-methoxy-1',6'-methanocyclodecapentaen-3'-yl)propanol.

EXAMPLE 59

A mixture of 3 g. of the methyl ester of 2-(8'-methoxy-1',6'-methanocyclodecapentaen-3'-yl)propionic acid, 1 g. of sodium methoxide, 1.5 g. of hydroxylamine hydrochloride and 50 ml. of methanol is allowed to stand for about 16 hours. The mixture is then filtered and the filtrate evaporated. The residue is neutralized by the addition of aqueous 1N hydrochloric acid and extracted with ether. The ether extracts are combined, washed with water, dried and evaporated to yield 2-(8'-methoxy-1',6'-methanocyclodecapentaen-3'-yl) propionhydroxamic acid.

EXAMPLE 60

A mixture of 1 g. of 2-(8'-methoxy-1',6'-methanocyclodecapentaen-3'-yl)propanol, 1 g. of sulfur trioxide, trimethylamine complex and 40 ml. of pyridine is stirred at 40° C. for 2½ days. The mixture is then poured into about 200 ml. of saturated sodium bicarbonate solution and extracted with ethyl acetate followed by extraction with n-butanol. The n-butanol extracts are combined, dried over sodium sulfate and evaporated under reduced pressure to yield a residue which is taken up in methanol and stirred for about 10 minutes with a carboxylic acid ion-exchange resin (Amberlite IRC–50, acid cycle). The mixture is filtered and the filtrate evaporated under reduced pressure to yield 2-(8'-methoxy-1',6'-methanocyclodecapentaen-3'-yl)propanol 2-sulfate monosodium salt.

EXAMPLE 61

A mixture of 2 g. of 2-(8'-methoxy-1',6'-methanocyclodecapentaen-3'-yl)propanol and 2 molar equivalents of β-cyanoethyl phosphate in pyridine is combined with pyridine solution of 8 molar equivalents of N,N'-dicyclohexylcarbodiimide and the reaction mixture is allowed to stand at room temperature for 24 hours. The reaction mixture is diluted with a small amount of water and allowed to stand at about 5°C. for 2 days. The mixture is then evaporated to dryness under reduced pressure and the residue taken up in about 35 ml. of aqueous methanol (1:1). This mixture is treated with about 12 ml. of 5 percent aqueous sodium hydroxide solution and after about 1 hour at room temperature, it is concentrated under reduced pressure, diluted with 30 ml. of aqueous methanol, concentrated and mixed with 75 ml. of water. This mixture is filtered and the filtrate is treated batchwise and then columnwise with an excess of a sulfonic acid ion-exchange resin (H+ form) to yield 2-(8'-methoxy-1',6'-methanocyclodecapentaen-3'-yl)propanol 2-phosphate.

EXAMPLE 62

The procedure of Examples 41 and 42 is repeated using 1,6-dichloromethanocyclodecapentaen-3-ylacetic acid and 1,6-difluoromethanocyclodecapentaen-3-ylacetic acid to obtain the corresponding methyl ester which is alkylated according to Example 9 to yield the methyl ester of 2-(1',6'-dichloromethanocyclodecapentaen-3'-yl)propionic acid and the methyl ester of 2-(1',6'-difluoromethanocyclodecapentaen-3'-yl)-propionic acid, respectively. The thus-obtained methyl ester can be hydrolyzed using the procedure of Example 44 to obtain the free acids. Alternatively, the methyl esters can be reduced using the procedure of Example 36 or 58 to obtain the corresponding alcohols, i.e. 2-(1',6'-dichloromethanocyclodecapentaen-3'-yl)propanol and 2-(1',6'-difluoromethanocyclodecapentaen-3'-yl)propanol, which can be oxidized using the procedure of Example 5 to the corresponding aldehyde.

EXAMPLE 63

According to the procedure of Example 42, 1,6-methano-8-methoxycyclodecapentaen-3-ylacetic acid is converted into the corresponding methyl ester. This methyl ester is alkylated according to the method of Example 43 to give the methyl ester of 2-(8'-methoxy-1',6'3'-yl)propionic acid
which is hydrolyzed according to the method of Example 44 to yield 2-(8'-methoxy-1',6'-methanocyclodecapentaen-3'-yl)propionic acid.

EXAMPLE 64

To a solution of 1 g. of 2-(8'-methoxy-1',6'-methanocyclodecapentaen-3'-yl)propanol and 25 ml. of benzene there is added 2 ml. of 4'-methoxy-5',6'-dihydro-2H-pyran. About 5 ml. of the mixture is distilled off to remove moisture and the remaining mixture is then cooled to room temperature. To the cooled mixture is added 0.1 g. of p-toluenesulfonic acid and the resulting mixture held at room temperature for 72 hours. The reaction mixture is washed with aqueous 5 percent sodium carbonate solution and then with water until a neutral pH is obtained, then dried over sodium sulfate and evaporated to yield the 4''-methoxytetrahydropyran-4''-yl ether of 2-(8'-methoxy-1',6'-methanocyclodecapentaen-3'-yl)propanol which can be purified by chromatography.

EXAMPLE 65

A mixture of 1 g. of 8-acetoxy-1,6-methanocyclodecapentaen-3-ylacetic acid and 4 ml. of oxalyl chloride in benzene is heated at reflux under anhydrous conditions for two hours. The solution is evaporated under vacuum, taken up in benzene and again evaporated to yield 8-acetoxy-1,6-methanocyclodecapentaen-3-ylacetic acid chloride which is treated with anhydrous ammonia to yield 2-(8'-acetoxy-1',6'-methanocyclodecapentaen-3'-yl)propionic acid amide.

To a cooled solution of 1 g. of 2-(8'-acetoxy-1',6'-methanocyclodecapentaen-3'-yl)propionic acid chloride and 75 ml. of tetrahydrofuran is added one molar equivalent of lithium tri-t-butoxy aluminum hydride and the mixture allowed to stand for about 12 hours at room temperature. The mixture is diluted with water, concentrated under vacuum and again diluted with water. This mixture is extracted with ethyl acetate and the ethyl acetate extracts are combined, dried and evaporated to give 2-(8'-acetoxy-1',6'-methanocyclodecapentaen-3'-yl)propanol. The thus-obtained aldehyde is reduced using a molar equivalent of lithium tri-t-butoxy aluminum hydride in tetrahydrofuran to afford 2-(8'-acetoxy-1',6'-methanocyclodecapentaen-3'-yl)propanol.

What is claimed is:

1. A compound selected from those represented by the following formulas (A) and (B):

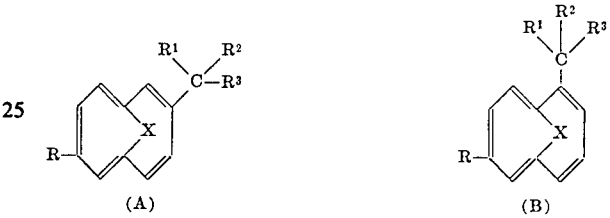

(A)  (B)

wherein,
R is hydrogen, lower alkyl, lower monocyclic alkyl, lower alkoxy or lower carboxylic acyloxy;
$R^1$ is hydrogen or lower alkyl;
$R^2$ is hydrogen, lower alkyl, methylene when taken together with $R^1$, or lower monocyclic alkyl when taken together with $R^1$ and the carbon atom to which $R^1$ and $R^2$ are attached;
$R^3$ is —$COOR^5$ in which $R^5$ is hydrogen, lower alkyl or an alkali metal; and
X is methylene, dichloromethylene or difluoromethylene.

2. A compound according to claim 1 wherein R is hydrogen and $R^3$ is —$COOR^5$.

3. A compound according to claim 1 wherein R is hydrogen, $R^1$ is methyl and $R^3$ is —$COOR^5$.

4. A compound according to claim 1 wherein R is methoxy and $R^3$ is —$COOR^5$.

5. A compound according to claim 1 wherein R is methoxy, $R^1$ is methyl and $R^3$ is —$COOR^5$.

6. A compound according to formula A of claim 1 wherein R is hydrogen, X is methylene, $R^1$ is methyl and $R^3$ is —$COOR^5$, in which $R^5$ is hydrogen.

7. A compound according to formula A of claim 1 wherein R is hydrogen, X is difluoromethylene, $R^1$ is methyl and $R^3$ is —$COOR^5$, in which $R^5$ is hydrogen.

8. A compound according to formula A of claim 1 wherein R is methoxy, X is methylene, $R^1$ is methyl and $R^3$ is —$COOR^5$, in which $R^5$ is hydrogen.

9. A compound according to formula A of claim 1 wherein R is methoxy, X is difluoromethylene, $R^1$ is methyl and $R^3$ is —$COOR^5$, in which $R^5$ is hydrogen.

10. A compound according to formula A of claim 1 wherein R is methoxy, X is dichloromethylene, $R^1$ is methyl and $R^3$ is —$COOR^5$, in which $R^5$ is hydrogen.

11. A compound according to formula A of claim 1 wherein R is methoxy, X is methylene, $R^1$ is methyl, $R^2$ is hydrogen, and $R^3$ is —$COOR^5$, in which $R^5$ is hydrogen or methyl.

* * * * *